United States Patent
Yamauchi et al.

(10) Patent No.: US 9,510,583 B2
(45) Date of Patent: Dec. 6, 2016

(54) PEST-ACCUMULATING DEVICE AND PEST-ACCUMULATING METHOD

(71) Applicant: NATIONAL UNIVERSITY CORPORATION KAGAWA UNIVERSITY, Takamatsu-shi, Kagawa (JP)

(72) Inventors: Koh-en Yamauchi, Kagawa (JP); Yoshiki Matsumoto, Kagawa (JP); Tetsuya Kondo, Kadoma (JP); Kohsyo Yamauchi, Miyazaki (JP)

(73) Assignee: NATIONAL UNIVERSITY CORPORATION KAGAWA UNIVERSITY, Takamatsu-shi, Kagawa (JP)

( * ) Notice: Subject to any disclaimer, the term of this patent is extended or adjusted under 35 U.S.C. 154(b) by 33 days.

(21) Appl. No.: 14/423,297

(22) PCT Filed: Aug. 22, 2013

(86) PCT No.: PCT/JP2013/004958
§ 371 (c)(1),
(2) Date: Feb. 23, 2015

(87) PCT Pub. No.: WO2014/030353
PCT Pub. Date: Feb. 27, 2014

(65) Prior Publication Data
US 2015/0223442 A1    Aug. 13, 2015

(30) Foreign Application Priority Data
Aug. 24, 2012 (JP) .................... 2012-185362

(51) Int. Cl.
*A01M 1/02* (2006.01)
*A01M 1/14* (2006.01)
*A01M 1/10* (2006.01)

(52) U.S. Cl.
CPC ............ *A01M 1/026* (2013.01); *A01M 1/10* (2013.01); *A01M 1/103* (2013.01); *A01M 1/14* (2013.01)

(58) Field of Classification Search
CPC ...... A01M 1/026; A01M 1/10; A01M 1/103; A01M 1/02
See application file for complete search history.

(56) References Cited

U.S. PATENT DOCUMENTS

| | | | | |
|---|---|---|---|---|
| 4,349,981 A | * | 9/1982 | Sherman ............. | A01M 25/004 43/114 |
| 4,395,842 A | * | 8/1983 | Margulies ............... | A01M 1/02 43/114 |

(Continued)

FOREIGN PATENT DOCUMENTS

| | | |
|---|---|---|
| JP | 07-11180 U | 2/1995 |
| JP | 09-285431 A | 11/1997 |

(Continued)

OTHER PUBLICATIONS

Makoto Yamaguchi, "Development of a House Dust Mite Evaluation System Through Image Analysis and Its Application", Journal of Architecture, Planning and Environmental Engineering, Jul. 2001, No. 545, pp. 37 to 44.

(Continued)

*Primary Examiner* — Gary Hoge
(74) *Attorney, Agent, or Firm* — Muncy, Geissler, Olds & Lowe, P.C.

(57) ABSTRACT

The purpose of the present invention is to provide a pest-accumulating device and pest-accumulating method that can attract pests, such as chicken mites and the like, and keep the said pests therein, and that can be easily handled by anyone, and to provide a pest-inspecting device that allows the captured pests to be evaluated.

A pest-accumulating device for accumulating mites such as chicken mites and northern fowl mites, includes an accumulating part 10 made of a material that allows a charged layer to be formed on a surface thereof. When a charged layer is formed in the accumulating part 10, mites, such as chicken mites and northern fowl mites, can be gathered in the accumulating part. When the pest-accumulating device 1 of the present invention is set up in a fixed place in a poultry house CH, mites, such as chicken mites that parasitize chickens CK, and even mites such as chicken mites that enter into narrow spaces in the poultry house and chicken cages KG, can be accumulated in the accumulating part 10. Then, the mites, such as chicken mites, in the poultry house CH can be efficiently exterminated by exterminating the mites, such as chicken mites, that have accumulated in the accumulating part 10.

25 Claims, 12 Drawing Sheets

(56) References Cited

U.S. PATENT DOCUMENTS

| | | | | |
|---|---|---|---|---|
| 5,937,571 A * | 8/1999 | Megargle | ............... | A01M 1/026 43/124 |
| 2005/0091911 A1 * | 5/2005 | Matts | .................... | A01M 1/026 43/131 |
| 2006/0005462 A1 * | 1/2006 | Ballard | ................. | A01M 1/026 43/132.1 |
| 2012/0291337 A1 * | 11/2012 | Curcio | .................... | A01M 1/14 43/114 |
| 2013/0223677 A1 * | 8/2013 | Ots | ....................... | A01M 1/106 382/103 |

FOREIGN PATENT DOCUMENTS

| JP | 10-052206 A | 2/1998 |
|---|---|---|
| JP | 2003226608 A * | 8/2003 |
| JP | 2005-204514 A | 8/2005 |
| JP | 2005-204575 A | 8/2005 |
| JP | 2006-015032 A | 1/2006 |
| JP | 3118663 U | 1/2006 |
| JP | 2006-067810 A | 3/2006 |
| JP | 2006-255690 A | 9/2006 |
| JP | 2009-261317 A | 11/2009 |
| JP | 2010-279270 A | 12/2010 |

OTHER PUBLICATIONS

International Search Report of PCT/JP2013/004958 mailed on Nov. 5, 2013.

* cited by examiner

Chicken Mite Colony

Chicken Mite Colony

3days

30min

1hr

48hr

3days

PEST-ACCUMULATING DEVICE AND PEST-ACCUMULATING METHOD

CROSS REFERENCE TO RELATED APPLICATIONS

This application is a national stage of International Application No. PCT/JP2013/004958 filed on Aug. 22, 2013, and which claims priority to Japanese Patent Applications No. 2012-185362 filed on Aug. 24, 2012, the disclosures of which are incorporated herein by reference.

TECHNICAL FIELD

The present invention relates to a pest-accumulating device, a pest-accumulating method and a pest-inspecting device. More specifically, the present invention relates to a pest-accumulating device and a pest-accumulating method that are capable of attracting pests such as chicken mites (scientific name: *Dermanyssus gallinae*) and northern fowl mites (scientific name: *Ornithonyssus sylviarum*) by static electrical charge and causing the pests to form a colony, and to a pest-inspecting device capable of evaluating the attracted pests.

BACKGROUND

In recent years, the poultry industry has been booming in countries around the world including Japan, Europe, Southeast Asia, America, North America, and South America. In each country, contagious diseases such as the avian influenza are legally designated contagious diseases and prevention of virus propagation is managed by the country. On the other hand, for management of a breeding environment of livestock, in order to limit entry of virus into a poultry house, by introducing a closed poultry house (such as a windowless poultry house) or the like, a substantially completely isolated environment can be created. However, the current situation is that it depends on business efforts of a business owner.

Further, in recent years, due to the revision of animal protection laws, business owners are obligated to improve and maintain appropriate breeding environments and technology, and the burden on the owner has thus been increasing. At the same time, among those pests that increase with deterioration in the breeding environment, chicken mites, in particular, cause direct damage to poultry production, and the impact of this damage is becoming globally evident.

Currently, however, certain points concerning the relation between the increase of chicken mites and the quality of the breeding environment are still unclear, and the timing of extermination and an effective extermination method have not been determined.

Sustained hot and humid conditions in the living environment of chicken mites, such as those which occur during the rainy season, result in prolific chicken mite reproduction. Closed poultry houses, in particular, have problems with prolific reproduction of chicken mites measuring about 0.5-1.0 mm in length. Chicken mites prefer narrow places, such as spaces between parts (for example, the hinges of metal parts forming a chicken cage), and they form nests (colonies) in such places. They crawl out of these spaces to parasitize the chickens and suck their blood. This blood sucking by chicken mites causes such problems as a reduction in the egg collection rate and reduced egg quality in the chickens affected. Therefore, eliminating the damage caused by chicken mites is extremely important in the business operations of poultry farms.

As described above, for the business owner, not only do such infestations cause a reduction in the productivity of poultry farming, but, in addition, despite the considerable cost and effort involved in extermination, there is currently no tool for investigating chicken mites.

Therefore, development of a tool that can serve as an indicator for exterminating chicken mites will not only contribute to improved productivity for poultry farmers but will also lead to improvement of the breeding environment. Therefore, extermination of chicken mites is important to poultry farmers.

Chicken mites not only damage chickens in the poultry house, but can also adhere to and suck the blood of workers working in the poultry house. In such cases, the workers may develop long-term dermatitis or itchy skin and may also experience allergic symptoms. Therefore, extermination of chicken mites not only improves the breeding environment, but also leads to improvement in the working environment for the worker.

Conventionally, extermination of chicken mites is usually performed by spraying a chemical such as a pesticide. However, such a chemical may contain substances that are also toxic to humans and chickens, and there will be restrictions governing its use. For this reason, when spraying such a chemical in a poultry house, it is necessary to move the chickens to a different place. However, such movement causes stress for the chickens, and this stress can result in the additional problem of a reduced egg collection rate.

Further, the chemical sprayed will not penetrate narrow spaces, such as the hinges in the cages that house chickens in the poultry house. Therefore, chicken mites that hide in such spaces cannot be exterminated. In addition, when a chemical is sprayed multiple times, some chicken mites may become resistant to the chemical, and when these chicken mites propagate, the usual chemical will no longer be effective.

In recent years, a technology has been developed in which pests are captured by using electricity and without using a chemical. Specifically, the technology has been developed in which electrostatic induction produced by an electric field is used to physically capture pests and the like (for example, Patent Documents 1-3). In such technology, due to the electric field generated by the application of high voltage to a pair of separated electrodes, electrostatic induction occurs in the pest when it approaches the electrodes, and the pest adsorbs to the electrodes. That is, the technology uses the principle of electrostatic adsorption. The principle of electrostatic adsorption is as follows.

First, when a high voltage is applied to a pair of electrodes, a potential difference is formed between them, generating an electric field. When a pest or the like enters the electric field, the field causes electrostatic induction to occur in the pest or the like. That is, due to electrostatic induction, a charge imbalance occurs on the body surface of the pest or the like. Then, due to the Coulomb force generated between the charge imbalance that occurs on the pest's body surface and the electrode, the pest or the like is adsorbed to the electrode and thereby captured. Such technology has the advantages that no chemicals are used and that small pests, such as aphids and mites, that are difficult to capture using an insect screen, can also be captured. It is conceivable that such technology is also applicable to capturing chicken mites in a poultry house.

In addition, a technology has also been developed in which pests and the like are attracted to a specific place by emitting a pheromone, light (such as ultraviolet light) or a color of light favored by pests and the like (for example, Patent Document 4).

PRIOR ART

Patent Literature

[Patent Document 1] Japanese Patent Laid-Open Publication No. 2005-204514.
[Patent Document 2] Japanese Patent Laid-Open Publication No. 2006-255690.
[Patent Document 3] Japanese Patent Laid-Open Publication No. 2010-279270.
[Patent Document 4] Japanese Patent Laid-Open Publication No. 2009-261317.

SUMMARY OF THE INVENTION

Problems to be Solved by the Invention

However, the technology in which a pest is captured by electrostatic induction only captures those pests that have accidentally entered the electric field formed by the electrodes, and does not have the effect of attracting a pest to the electric field. In other words, the technology that utilizes electrostatic induction is merely comparable to a spider web woven of sticky strings to capture a pest that has accidentally entered the web. Therefore, one problem with using electrostatic induction technology to capture pests is the fact that a pest cannot be captured if it does not enter the electric field formed by the electrodes. In addition, because it is necessary to apply a high voltage to the electrodes in order to generate electrostatic induction, there are limitations on where the technology can be applied and on how it is handled.

On the other hand, the technology in which pests are attracted by light and the like has the function of attracting pests but does not have the function of capturing the attracted pests. In addition, when light is used for attraction, the light must be constantly radiated. Therefore, there are also limitations regarding where the technology can be applied, and, in some cases, the light emitted may be undesirable for humans and other animals.

Based on the above, there is a need for the development of a device that can attract pests, such as chicken mites and the like, and make those pests remain in the place to which they have been attracted, and that, moreover, has few restrictions on its use and can be easily handled by anyone.

In view of the above, the purpose of the present invention is to provide a pest-accumulating device and pest-accumulating method that can attract pests, such as chicken mites and the like, and keep the said pests therein, and that can be easily handled by anyone, and to provide a pest-inspecting device that allows the captured pests to be evaluated.

Means to Solve the Subject(S)

A pest-accumulating device of the first invention for accumulating mites such as chicken mites and northern fowl mites, comprising: an accumulating part made of a material that allows a charged layer to be formed on a surface thereof.

A pest-accumulating device of the second invention is, in the first invention, that the charged layer is formed by corona discharge.

A pest-accumulating device of the second invention is, in the first or second invention, that a charge leakage prevention part that holds a charge, which is generated in the charged layer of the accumulating part, so that the charge does not escape.

A pest-accumulating device of the fourth invention is, in any of the first to third inventions, that the accumulating part has an uneven surface.

A pest-accumulating device of the fifth invention is, in any of the first to fourth inventions, that a charge generation unit is provided to form the charged layer of the accumulating part, wherein the charge generation unit has a function of forming the charged layer of the accumulating part by corona discharge.

A pest-accumulating device of the sixth invention is, in the first invention, that the charged layer is formed by charge separation.

A pest-accumulating device of the seventh invention is, in the first or sixth invention, that a charge leakage prevention part is provided to hold the charge, which is generated in the charged layer of the accumulating part, so that the charge does not escape.

A pest-accumulating device of the eighth invention is, in any of the first, sixth and seventh inventions, that the accumulating part has an uneven surface.

A pest-accumulating device of the ninth invention is, in any of the first, sixth, seventh and eight inventions, that a charge generation unit is provided to form the charged layer of the accumulating part, wherein the charge generation part has a function of forming the charged layer of the accumulating part by charge separation.

A pest-accumulating device of the tenth invention is, in the ninth invention, that the charge generation unit generates frictional charging between the charge generation part and the accumulating part and forms the charged layer of the accumulating part by the frictional charging.

A pest-accumulating device of the eleventh invention is, in any of the first to tenth inventions, that a diffusion unit is provided having a function of causing the mites to disperse from a colony that is formed by the mites in a region which the mites inhabit.

A pest-accumulating device of the twelfth invention is, in the eleventh invention, that the diffusion unit applies a diffusion liquid made of pyroligneous acid to the region which the mites inhabit.

A pest-accumulating method of the thirteenth invention for accumulating mites such as chicken mites and northern fowl mites, comprises forming a charged layer in an accumulating part that allows a charged layer to be formed on a surface thereof and installing the accumulating part in which the charged layer is formed in a region which the mites inhabit.

A pest-accumulating method of the fourteenth invention is, in the thirteenth invention, that the charged layer is formed by corona discharge.

A pest-accumulating method for fifteenth invention is, in the thirteenth or fourteenth invention, that the accumulating part is arranged in a state in which the accumulating part is held in a charge leakage prevention part so that a charge generated in the charged layer of the accumulating part cannot escape.

A pest-accumulating method of the sixteenth invention is, in any of the thirteenth, fourteenth, and fifteenth inventions, that the accumulating part has an uneven surface.

A pest-accumulating method of the seventeenth invention is, in the thirteenth invention, that the charged layer is formed by corona discharge.

A pest-accumulating method of the eighteenth invention is, in the thirteenth or seventeenth invention, that the accumulating part is arranged in a state in which the accumulating part is held in a charge leakage prevention part so that a charge generated in the charged layer of the accumulating part cannot escape.

A pest-accumulating method of the nineteenth invention is, in any of the thirteenth, seventeenth and eighteenth inventions, that the accumulating part has an uneven surface.

A pest-accumulating method of the twentieth invention is, in any of the thirteenth, seventeenth, eighteenth and nineteenth inventions, that the charged layer of the accumulating part is formed by frictional charging.

A pest-accumulating method of the 21st invention is, in any of the thirteenth to twentieth inventions, to include causing the mites to disperse from a colony that is formed by the mites in a region which the mites inhibit.

A pest-accumulating method of the 22nd invention is, in the 21st invention, to include applying a diffusion liquid made of pyroligneous acid to the colony formed by the mites in the region which the mites inhabit.

A pest-inspecting device of the 23rd invention for inspecting the state of mite inhabitation includes an accumulating unit for accumulating the mites, that is provided with an accumulating part that is placed in an inspection region for inspecting the state of mite inhabitation; and an analysis unit that evaluates the state of mite inhabitation in the inspection region based on the state of a colony formed by the mites, the colony being accumulated in the accumulating part of the accumulating unit. Wherein, the accumulating unit is the accumulating part of the pest-accumulating device according to any of the above the first to twelfth inventions.

A pest-inspecting device of the 24th invention is, in the 23rd invention, that the analysis unit obtains an area of the colony and a number of specific mites existing in the colony, and evaluates the state of mite inhabitation in the inspection region based on the number of the specific mites and the area of the colony.

A pest-inspecting device for the 25th invention is, in the 24th invention, that the specific mites are blood-sucking mites that have sucked blood.

A pest-inspecting device for the 26th invention is, in the 25th invention, that the specific mites are blood-sucking mites that have sucked blood.

A pest-inspecting device for the 27th invention is, in the 26th invention, that the analysis unit distinguishes the blood-sucking mites from other mites based on colors of body surfaces of the blood-sucking mites.

Advantages of the Invention

According to the first aspect of the present invention, when a charged layer is formed in the accumulating part, mites, such as chicken mites and northern fowl mites, can be gathered in the accumulating part. In addition, the mites, such as chicken mites, gathered in the accumulating part can be made to stay in the said part. Therefore, when the pest-accumulating device of the present invention is set up in a fixed place in a poultry house, mites such as chicken mites that parasitize chickens, and even mites such as chicken mites that enter into narrow spaces in the poultry house and chicken cages, can be accumulated in the accumulating part. Then, the mites, such as chicken mites, in the poultry house can be efficiently exterminated by exterminating the mites, such as chicken mites, that have accumulated in the accumulating part.

According to the second aspect of the present invention, the charged layer of the accumulating part is charged by corona discharge. Then, it is possible to form a charged layer with the desired charge because the amount of ions generated by corona discharge can be easily adjusted. Moreover, the layer can be efficiently charged in a short time.

According to the third aspect of the present invention, when the accumulating part is held by (or rests on) by the charge leakage prevention part, the charge imbalance generated in the charged layer of the accumulating part can be maintained over a long time period. That is, the charged state of the accumulating part can be maintained during a time period when mites, such as chicken mites, are active (for example, from evening to the next morning), thus facilitating the formation of a larger colony in the accumulating part.

According to the fourth aspect of the present invention, the accumulating part has an uneven surface, and thus the interspaces formed by the uneven surface become hiding places for mites, such as chicken mites, gathered in the accumulating part, thereby creating an environment in which it is easier for mites such as chicken mites to form a colony. Thus, it is possible to maintain a state within the accumulating part that facilitates the accumulation of mites, such as chicken mites, over a long time period.

According to the fifth aspect of the present invention, the charged layer of the accumulating part can be easily formed by means of the charge generation unit. In addition, the charge generation unit forms the charged layer by corona discharge, and thus a charged layer can be easily formed in the accumulating part.

According to the sixth aspect of the present invention, the charged layer of the accumulating part is charged by charge separation that occurs during contact between, or the separation of, objects, such as in frictional charging due to friction between objects, separation charging due to separation of objects in close contact, and collision charging due to collision between objects. Therefore, it is not necessary to apply a high voltage from outside in order to form the charged layer in the accumulating part, and thus the device can be safely and easily handled.

According to the seventh aspect of the present invention, when the accumulating part is held by the charge leakage prevention part, the charge imbalance generated in the charged layer of the accumulating part can be maintained over a long time period. That is, the charged state of the accumulating part can be maintained during the time period when mites, such as chicken mites, are active (for example, from evening to the next morning), thus facilitating the formation of a larger colony in the accumulating part.

According to the eighth aspect of the present invention, the accumulating part has an uneven surface, and thus the interspaces formed by the uneven surface become hiding places for the mites, such as chicken mites, gathered in the accumulating part. This creates an environment in which it is easier for mites, such as chicken mites, to form a colony. Thus, it is possible to maintain a state within the accumulating part that facilitates the accumulation of mites, such as chicken mites, over a long time period.

According to the ninth aspect of the present invention, the charged layer of the accumulating part can be easily formed by means of the charge generation unit.

According to the tenth aspect of the present invention, the charge generation unit forms the charged layer by charge separation due to frictional charging, and thus the charged layer can be easily formed in the accumulating part. In addition, since frictional charging is used, the charged layer can be even more easily and safely formed.

According to the eleventh aspect of the present invention, mites, such as chicken mites, inhabiting the inside of the colony can be expelled from the colony by a diffusion unit, thereby further improving the efficiency of mite, including chicken mite, extermination.

According to the twelfth aspect of the present invention, the diffusion liquid used is pyroligneous acid, which is safe for poultry, such as chickens, and for the people who use the same. In addition, by simply spraying or otherwise applying pyroligneous acid, the efficiency of mite accumulation, including chicken mite accumulation, can be improved.

According to the thirteenth aspect of the present invention, by just placing the accumulating part with a charged layer in a region inhabited by mites, such as chicken mites, the accumulating part can gather mites, such as chicken mites, that are within the vicinity of the accumulating part. Further, the mites, such as chicken mites, gathered in the accumulating part can be retained in the accumulating part. Then, by just placing the accumulating part in a fixed place in a poultry house where mites, such as chicken mites, occur, mites, such as chicken mites, that parasitize chickens, and mites, such as chicken mites, that enter the narrow spaces of the poultry house and chicken cages, can be gathered in the accumulating part. Then, mites, such as chicken mites, in the poultry house can be efficiently exterminated by exterminating the mites, such as chicken mites, that have accumulated in the accumulating part.

According to the fourteenth aspect of the present invention, the charged layer of the accumulating part is formed by corona discharge. Therefore, the charged layer of the accumulating part can be charged to the desired voltage. In addition, because the charged layer is charged by corona discharge, the charged layer can be more efficiently formed within a short time period.

According to the fifteenth aspect of the present invention, the accumulating part is held by the charge leakage prevention part. Therefore, the charge imbalance generated in the charged layer of the accumulating part can be maintained over a long time period. That is, the charged state of the accumulating part can be maintained during a time period when mites, such as chicken mites, are active (for example, from evening to the next morning), and thus a larger colony can be formed in the accumulating part.

According to the sixteenth aspect of the present invention, the accumulating part has an uneven surface, and thus the interspaces formed by the uneven surface become hiding places for the mites, such as chicken mites, gathered in the accumulating part. This creates an environment in which it is easier for mites, such as chicken mites, to form a colony, and thus, it is possible to maintain a state within the accumulating part that facilitates the accumulation of mites, such as chicken mites, over a long time period According to the seventeenth aspect of the present invention, the charged layer of the accumulating part is charged by charge separation that occurs during the contact between, or the separation of, objects, such as in frictional charging due to friction between objects, separation charging due to the separation of objects in close contact, and collision charging due to the collision between objects. Therefore, it is not necessary to apply a high voltage from outside in order to form the charged layer of the accumulating part, and thus the formation of the charged layer can be safely and easily performed.

According to the eighteenth aspect of the present invention, the accumulating part is held by the charge leakage prevention part. Therefore, the charge imbalance generated in the charged layer of the accumulating part can be maintained over a long time period. That is, the charged state of the accumulating part can be maintained during a time period when mites, such as chicken mites, are active (for example, from evening to next morning), and thus a larger colony can be encouraged to form in the accumulating part.

According to the nineteenth aspect of the present invention, the accumulating part has an uneven surface, and thus the interspaces formed by the uneven surface become hiding places for the mites, such as chicken mites, gathered in the accumulating part. This creates an environment in which it is easier for mites, such as chicken mites, to form a colony, and thus, it is possible to maintain a state within the accumulating part that facilitates the accumulation of mites, such as chicken mites, over a long time period According to the twentieth aspect of the present invention, the charged layer is formed by frictional charging. Therefore, the charged layer of the accumulating part can be easily charged. In addition, since frictional charging is used, the charged layer can be even more easily and safely formed.

According to the twenty first aspect of the present invention, by expelling the mites, such as chicken mites, inhabiting the colony from that colony, the efficiency of mite extermination, such as chicken mite extermination, can be further improved.

According to the twenty second aspect of the present invention, by simply spraying or otherwise applying the diffusion liquid made of pyroligneous acid into the colony, the chicken mite accumulation efficiency can be improved. In addition, the pyroligneous acid used is made of natural ingredients and thus is safe for poultry, such as chickens, and for the people who use it.

According to the twenty third aspect of the present invention, when the accumulating part is placed in an inspection area, mites, such as chicken mites, inhabiting the inspection area can be encouraged to accumulate and form a colony in the accumulating part. It is then possible to evaluate with an analysis unit the state of mite inhabitation, such as chicken mites, in the inspection area based on the state of the chicken mite colony in the accumulating part. That is, by just placing the accumulating part in the inspection area and observing the formation of the colony, it is possible to determine the state of mites such as chicken mites in the poultry house. In other words, the state of the environment in which chickens and the like are being reared can be evaluated. It is then possible to take appropriate measures (such as determining the timing of pest extermination, or using a feeding method) in response to the state of mite inhabitation, including that of chicken mites.

According to the twenty-fourth aspect of the present invention, mites such as chicken mites can be reliably accumulated in the accumulating part. Therefore, the state of mite inhabitation, such as that of chicken mites, in the inspection area can be accurately assessed on the basis of the colony formed in the accumulating part.

According to the twenty fifth aspect of the present invention, it is possible to grasp the state of mite inhabitation, such as that of chicken mites, in the inspection area based on the number of blood-sucking mites. Therefore, the state of the environment for rearing poultry in the inspection area can be appropriately evaluated.

According to the twenty-sixth and twenty-seventh aspects of the present invention, mites that have sucked blood can be distinguished from other mites based on the color of the mites' body surface, which changes when blood is sucked.

Therefore, the number of blood-sucking mites existing in the colony can be accurately and easily determined.

BRIEF DESCRIPTION OF DRAWINGS

FIG. 1A is a cross-sectional view; and FIG. 1B is a perspective view illustrating a state in which chicken mites have accumulated in an accumulating part 10 of the accumulating device 1 and have formed a colony WC.

FIG. 2A is a perspective view of a windowless poultry house CH; and FIG. 2B is a schematic explanatory diagram illustrating a state in which the pest-accumulating devices 1 of the present embodiment are set up in the windowless poultry house.

FIG. 4A is a schematic explanatory diagram illustrating the accumulating part 10 of the pest-accumulating device 1 of the present embodiment and the charge generation unit 20; FIG. 4B is a schematic explanatory diagram illustrating the charge formation part of the charge generation unit 20; and FIG. 4C illustrates a schematic explanatory diagram illustrating a state in which the accumulating part 10 is charged with static electrical charge E.

FIG. 5A is a schematic perspective view; FIG. 5B is a schematic cross-sectional view; and FIG. 5C is a schematic explanatory diagram illustrating a state in which the accumulating part 10 has been removed from the pest-accumulating device 1 of the present embodiment.

FIG. 6A shows the state immediately before the experimental device is installed; and FIG. 6B shows the state 3 days after the experimental device was installed.

FIG. 7A shows the state 30 minutes after the experimental device was installed; FIG. 7B shows the state 1 hour after installment; and FIG. 7C shows the state 48 hours after installment.

FIG. 8A shows the state immediately before the experimental device was installed; and FIG. 8B shows the state 3 days after the experimental device was installed.

EMBODIMENTS TO EXECISE THE INVENTION

Based on the drawings, an embodiment of the present invention is described below.

The pest-accumulating method of the present invention is a method for accumulating mites, such as chicken mites, by using a pest-accumulating device that has an accumulating part, the surface of which is charged with a static electrical charge.

The present invention is an invention that is accomplished based on the characteristic that mites, such as chicken mites, gather where there is a static electrical charge, this characteristic having been discovered for the first time by the inventors.

The pest-accumulating method that uses the pest-accumulating device of the present invention is suitable for accumulating chicken mites (scientific name: *Dermanyssus gallinae*). However, the pests to be accumulated are not limited to chicken mites. The method is also applicable to mites, such as northern fowl mites (scientific name: *Ornithonyssus sylviarum*), that have similar characteristics to chicken mites and suck blood from mammals, such as poultry and livestock. In particular, among those mites targeted, those that form colonies like chicken mites can be more effectively kept in the accumulating part of the pest-accumulating device of the present invention.

A case in which chicken mites, which cause extensive damage to the poultry industry, are collected by the accumulating part is described below as one example of the types of mites that can be collected by the accumulating part of the pest-accumulating device of the present invention.

Further, in the present specification, accumulation is a concept that includes the state in which many individual mites, such as chicken mites or northern fowl mites, swarm over one another or one in which they form a colony (nest).

First, before describing the pest-accumulating method of the present invention, an outline of the pest-accumulating device is described. The details of the pest-accumulating device of the present embodiment will be described later.

(Description of Pest-Accumulating Device 1)

Figure 1A:
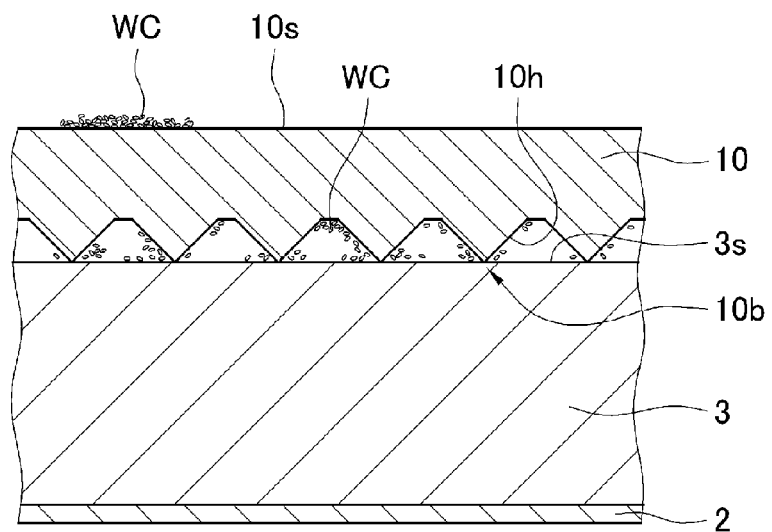
FIGS. 1A and 1B are schematic explanatory diagrams illustrating a pest-accumulating device 1 of the present embodiment.
Figure 1B:
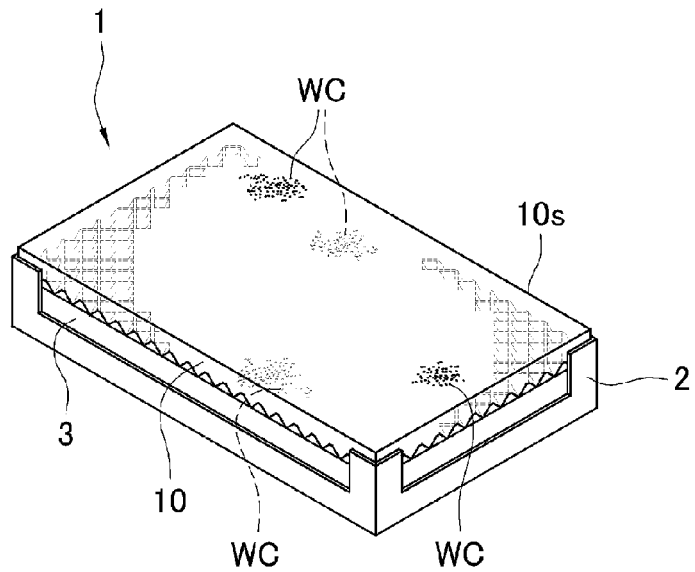

As illustrated in FIGS. 1A and 1B, the pest-accumulating device 1 includes an accumulating part 10, and a charge leakage prevention part 3 that holds the accumulating part 10.

(Accumulating Part 10)

As illustrated in FIGS. 1A and 1B, the accumulating part 10 is a material of which the surface 10s can be charged with a static electrical charge E, and is a member on the surface of which a charged layer can be formed. The charge leakage prevention part 3 is a member that is made of a material that prevents the static electrical charge E of the charged layer of the accumulating part 10 from escaping to the ground or the like when the charge leakage prevention part 3 is placed on the ground or the like while holding the accumulating part 10 when a charged layer has been formed on the said accumulating part.

As illustrated in FIG. 1B, it is preferable to provide, in the pest-accumulating device 1, a base part 2 that can accommodate the accumulating part 10 and the charge leakage prevention part 3 in a state in which the accumulating part is held by the charge leakage prevention part 3. When the base part 2 is provided, it becomes easier to handle the pest-accumulating device 1. For example, when the base part 2 is attached, it is easier to carry the pest-accumulating device 1 with the accumulating part 10 resting on the charge leakage prevention part 3.

Further, the static electrical charge that is referred to in the present specification and that is used in the pest-accumulating device refers to a phenomenon in which a charge imbalance occurs in the accumulating part of the pest-accumulating device, and is a concept that includes cases where the charge imbalance is formed in the accumulating part due to friction, contact, and the like, and also cases where the charge imbalance is formed in the accumulating part due to charged ions emitted from a corona discharge device. Details are described later.

(Description of Pest-Accumulating Method)

In the following, the pest-accumulating method of the present embodiment is described.

Figure 2A:
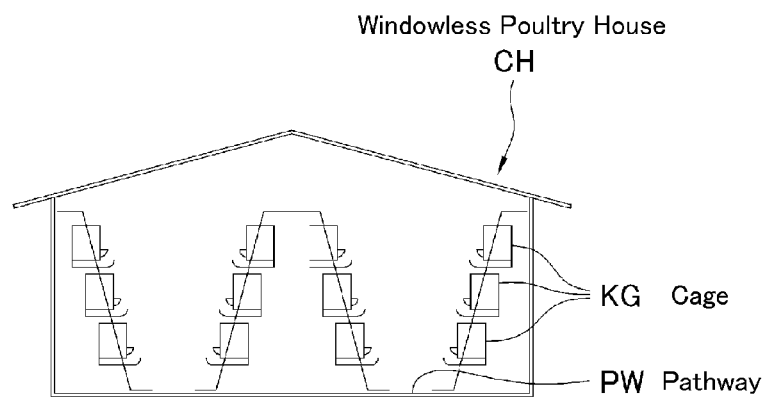
FIGS. 2A and 2B are schematic explanatory diagrams illustrating the pest-accumulating method of the present embodiment using the pest-accumulating device 1 of the present embodiment.
Figure 2B:
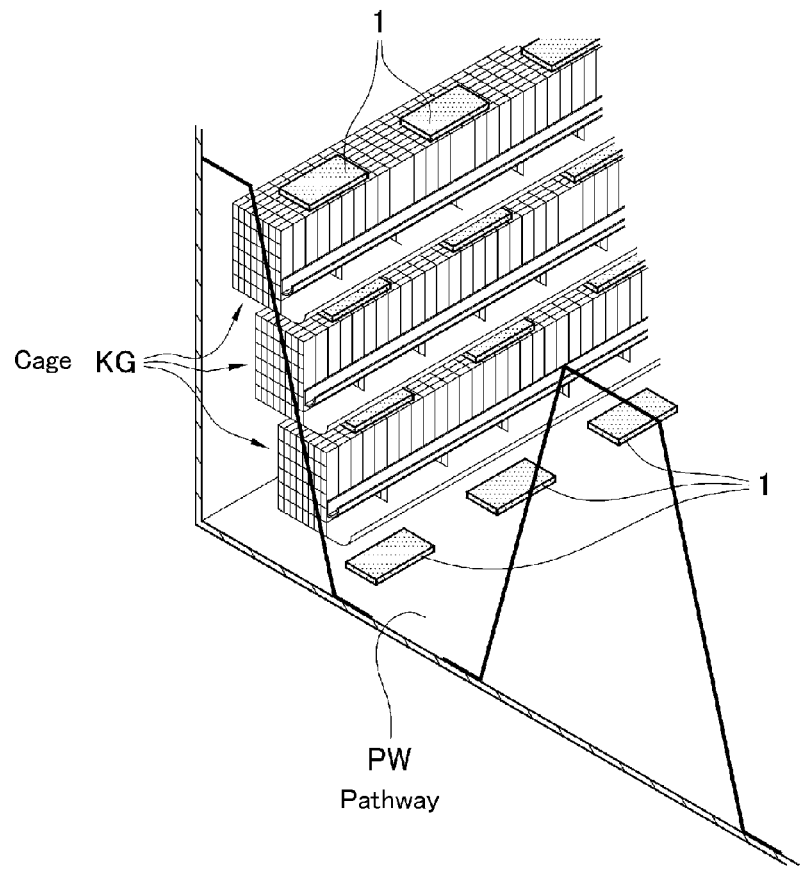

In FIGS. 2A and 2B, the symbol CH indicates a closed poultry house (windowless poultry house) (hereinafter, simply referred to as a poultry house); the symbol KG indicates a chicken cage; and the symbol PW indicates the pathway in the poultry house. The poultry house CH is not particularly limited as long as it does not have windows and as long as it has a device or the like to control the temperature and humidity inside. Further, the cage KG is not particularly limited as long as it can house a chicken, such as a commonly-used cage for chicken egg collection.

Below is a description of the method whereby the pest-accumulating device 1 is used to accumulate chicken mites in the poultry house CH.

First, a layer charged with a static electrical charge E is formed on the surface 10s of the accumulating part 10 of the pest-accumulating device 1. For example, when the accumulating part 10 is made of acrylic resin, a charged layer can be formed on the surface 10s of the accumulating part 10 by rubbing the surface 10s of the accumulating part 10 with a cloth made of polyester. Further, it is also possible to form a charged layer on the surface 10s of the accumulating part 10 by supplying charged ions from a corona discharge device to the surface 10s of the accumulating part 10. Details of the method or the like for forming a charged layer on the surface 10s of the accumulating part 10 will be described later.

Next, as illustrated in FIG. 2B, the pest-accumulating device 1, in which a charged layer has been formed on the surface 10s of the accumulating part 10 as described above, is placed on a pathway in the poultry house CH. In this case, the accumulating parts 10 of adjacent pest-accumulating devices 1 are arranged at intervals of about 1-1.5 m. In other words, they are placed so that a region with a radius of about 1-1.5 m can be covered by one accumulating part 10. When the pest-accumulating devices 1 are placed as described above, chicken mites can be efficiently accumulated in the accumulating part 10. After having been left in place for a predetermined time (for example, 24 hours), the pest-accumulating devices 1 are collected.

Generally, chicken mites remain in the nest during the daytime, and crawl out from the nest and become active at night. Therefore, it is preferable that the pest-accumulating devices 1 be left in the poultry house CH during the period from evening to dawn.

As described above, by simply placing the pest-accumulating device 1, the accumulating part 10 of which has been charged with the static electrical charge E, in a poultry house CH that is inhabited by chicken mites, it is possible to accumulate chicken mites in the vicinity of the accumulating part 10 within the said part 10. For example, as illustrated in FIGS. 1A and 1B, chicken mites can be gathered on the surface 10s of the accumulating part 10 of the pest-accumulating device 1 and in the spaces between the accumulating part 10 and the charge leakage prevention part 3.

In addition, as illustrated in FIGS. 1A and 1B, the chicken mites that are gathered in the accumulating part 10 can be kept therein. The reasons for this are presumed to be as follows.

First, when the number of chicken mites gathered in the accumulating part 10 reaches a certain level, the chicken mites swarm (accumulate) so as to overlap each other and form a nest WC (hereinafter, referred to as the colony WC) in the accumulating part 10. Once the colony WC is formed, the chicken mites' habitual behavior of staying in the colony keeps the said mites in the accumulating part 10.

That is, the pest-accumulating method of the present invention utilizes the natural tendency of chicken mites to accumulate (form a colony).

Therefore, by simply placing the accumulating part 10 of the pest-accumulating device 1 at predetermined places in the poultry house CH where chicken mites occur (which has been contaminated by chicken mites), chicken mites that parasitize the chickens CK and chicken mites that have entered crevices in the poultry house CH, the chicken cage KG and the like can be accumulated in the accumulating part 10. By exterminating the chicken mites accumulated in the accumulating part 10, chicken mites in the poultry house CH can be efficiently exterminated.

Further, the colony WC of the chicken mites expands in proportion to the length of time the pest-accumulating device 1 is left in place. At the same time, the size of the colony WC of the chicken mites is also proportional to the number of chicken mites inhabiting the region within a predetermined range from the accumulating part 10. The size of the chicken mite colony WC expands along with the increase in the number of chicken mites inhabiting the said colony. Therefore, in order to efficiently exterminate chicken mites, it is preferable that the accumulating part 10 be placed for a relatively long period of time in a place that is estimated to be inhabited by more chicken mites.

(Accumulating Path of Chicken Mites)

Further, paths by which chicken mites gather in the accumulating part 10 can be assumed to be as follows.

Figure 3:
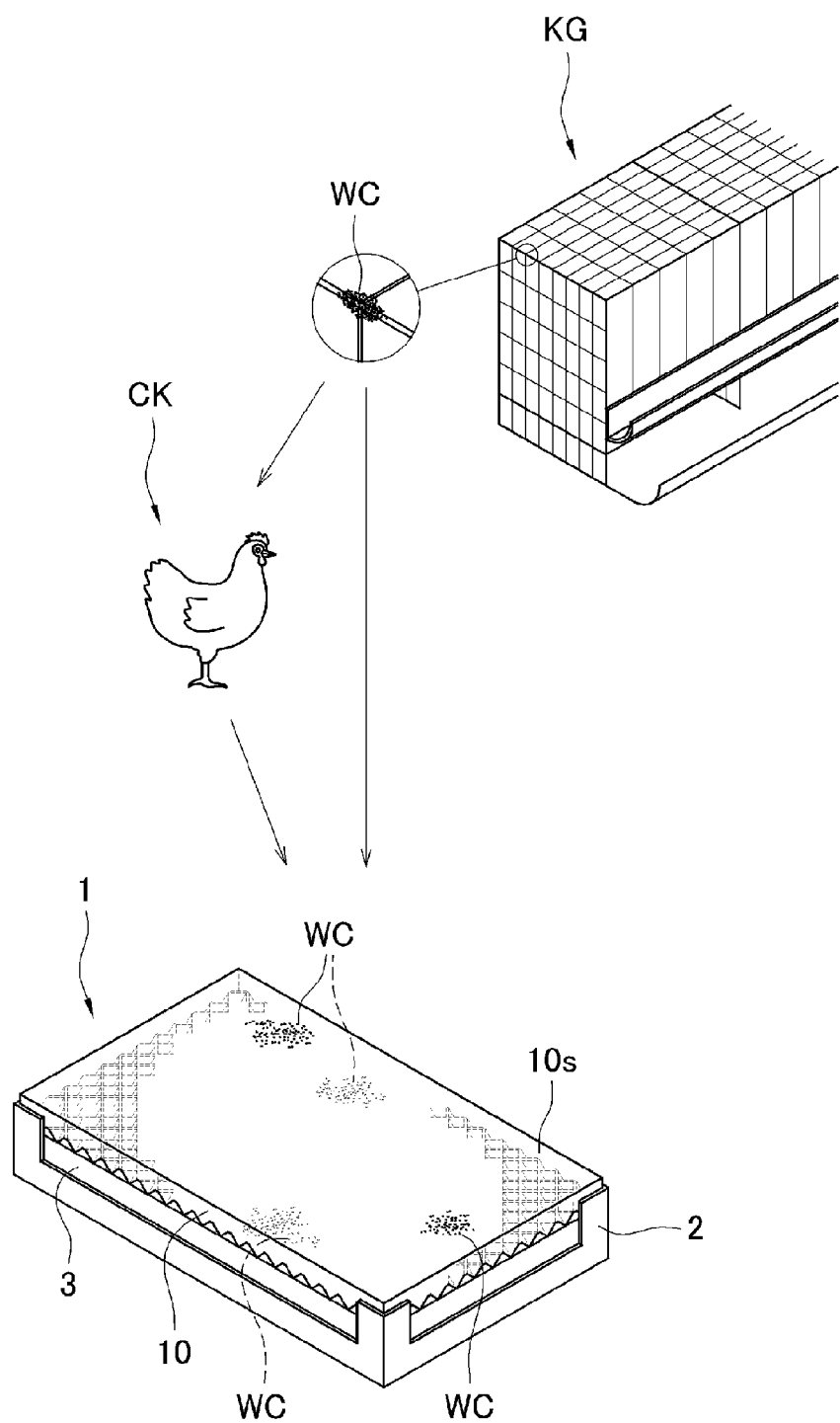
FIG. 3 is a schematic explanatory diagram illustrating paths along which chicken mites are accumulated in the accumulating part 10 of the pest-accumulating device 1 of the present embodiment.

As illustrated in FIG. 3, it can be assumed that one path would be for chicken mites inside the colony WC that is formed in the crevices inside the poultry house CH (for example, in FIG. 3A, in the hinge of a metal part of the cage KG) to gather directly in the accumulating part 10. On the other hand, it can be assumed that another path would be for the chicken mites to crawl out from the crevices inside the poultry house CH, parasitizes a chicken CK and then gather in the accumulating part 10.

Furthermore, the phenomenon in which chicken mites gather on the charged layer of the accumulating part 10 that is formed by a static electrical charge E was first discovered by the inventors. The reason for the phenomenon is currently unknown. However, the following can be presumed as one reason for the phenomenon.

The natural behavior of chicken mites is to form a colony WC in a crevice or the like in the poultry house CH and to move back and forth between the colony WC and the chickens CK. Specifically, the lives of chicken mites involve moving from the colony WC to the chicken CK, sucking the blood of the chicken CK, and then returning to the colony WC. The blood of birds, such as chickens, which chicken mites prefer to suck, is said to differ from the blood of humans and the like in that bird blood has an imbalance of electrical charge.

Bird blood is also said to be essential for breeding in chicken mites. Bird blood, especially chicken blood, has nucleated red blood cells, and the amount of a DNA component or genome contained in the same amount of blood differs greatly from that in human red blood cells. The DNA component or genome is negatively charged. Therefore, there is a possibility that chicken mites which have sucked a large amount of blood are affected by the charged component in the blood and that this exerts some influence on the voluntary behaviors of the chicken mites.

It can be presumed that variations in the internal and external electrical charge in the bodies of chicken mites may be an important element in their life activities, particularly in the chicken mite breeding season. For example, static electrical charge is a factor that induces breeding in chicken mites, and it can be assumed that chicken mites form the colony WC on the accumulating part 10 with the static electrical charge in order to breed.

In summary, in the pest-accumulating device 1, due to the nature of chicken mites, chicken mites can be accumulated in the accumulating part 10 that is charged with the static electrical charge E. When the chicken mites accumulated in the accumulating part 10 are exterminated, the chicken mites in the poultry house can be efficiently exterminated.

Further, with the pest-accumulating device 1 of the present invention, it becomes possible not only to accumulate chicken mites with the accumulating part 10, but also to suppress the further propagation of chicken mites. For example, when the quality of the colony WC is controlled based on the amount of electrical charge applied to the accumulating part 10, it is possible that the invention can contribute to application of development of drugs required to effectively exterminate chicken mites.

(Charging by Charge Separation)

The method for charging the surface 10s of the accumulating part 10 is not particularly limited. For example, the surface 10s can be charged by charge separation, which occurs through contact between, or the separation of different members (objects) or the like.

Specifically, a positive or negative charge can be applied to the surface (so-called interface) of each of two different objects that are brought into contact with each other or separated from each other, such as in frictional charging due to friction between different objects, separation charging due to the separation of objects in close contact, collision charging due to the collision between different objects, and the like. That is, due to such charge separation, the surface 10s of the accumulating part 10 and the surface of the member that is brought into contact with the same can each be charged with a positive or negative static electrical charge E.

When charging is performed using such a method, a high voltage is not applied to the accumulating part and the like from an external power source or the like, and therefore, handling of the pest-accumulating device 1 is easier than cases where a high voltage is applied to generate a static electrical charge. Specifically, in cases where a high voltage is applied, current flows between two electrodes when dielectric breakdown occurs, or between the electrode and discharge object or the like, and this is very dangerous for humans and animals and the like. However, in the accumulating part 10 of the pest-accumulating device 1 that is used in the pest-accumulating method of the present embodiment, the surface 10s is formed by using charge separation. Therefore, compared to a device or the like in which a high voltage from an external power source is applied, the pest-accumulating device 1 can be more safely handled.

Further, wiring or the like for connecting the accumulating part 10 to a power source is also unnecessary. Therefore, the accumulating part 10 can be freely installed even in places off the ground, or away from the pathway PW, the walls and the like (such as above the cage KG inside the poultry house CH) (see FIG. 2B). Therefore, it is possible to arrange the accumulating part 10 over a broader region within the poultry house CH, making it possible to cover nearly the entire area of the poultry house CH. In this case, because it is not necessary to apply a high voltage from an external power source to the accumulating part 10 in order to form a charged layer in the same, the accumulating part 10 can be safely handled during installation in the poultry house CH.

Further, of the charge separation methods, it is possible to charge the surface 10s of the accumulating part 10 by using a static electrical charge E generated by frictional charging. Specifically, the static electrical charge E can be generated by bringing a member made of a different material from the accumulating part 10 into contact with the surface 10s of the accumulating part 10 and rubbing the surface 10s with the member.

For example, as described above, when the accumulating part 10 is made of acrylic resin, frictional charging can be formed on the surface 10s of the accumulating part 10 by placing a cloth made of polyester against the surface 10s of the accumulating part 10 and rubbing the same with the cloth. In this case, the charged layer of the surface 10s of the accumulating part 10 is formed by frictional charging. Therefore, anyone can easily charge the layer of the accumulating part 10, and, since the method is frictional charging, the layer can be easily and safely charged.

Further, as illustrated in FIGS. 1A and 1B or FIG. 3, the accumulating part 10 is held in such a manner that the bottom surface 10b of the accumulating part 10 is in contact with the upper surface 3s of the charge leakage prevention part 3. The charge leakage prevention part 3 is made of a material that conducts hardly any electricity. Therefore, in such a state, even when the accumulating part 10 is charged with the static electrical charge E, the static electrical charge E will not leak from the charge leakage prevention part 3. In other words, it is possible to maintain the static electrical charge E in the accumulating part 10 over a long period of time because the accumulating part 10 is maintained in an insulated state.

Therefore, even when the accumulating part 10 of the pest-accumulating device 1 is placed in the poultry house CH during the time period when chicken mites are active (for example, from evening to next morning), the charged state of the accumulating part 10 can be maintained, and thus it is possible to facilitate the formation of a larger colony WC in the accumulating part 10.

Further, it is preferable that the accumulating part 10 have a structure in which interspaces 10h are formed between the bottom surface 10b and the upper surface 3s of the charge leakage prevention part 3 when the accumulating part 10 is arranged in such a manner that the bottom surface 10b of the accumulating part 10 is in contact with the upper surface 3s of the charge leakage prevention part 3.

The interspaces 10h that are formed between the bottom surface 10b of the accumulating part 10 and the upper surface 3s of the charge leakage prevention part 3 become hiding places for the chicken mites gathered in the accumulating part 10. As described above, chicken mites prefer narrow crevices in the poultry house CH and form colonies WC in such spaces. Therefore, such interspaces 10h result in an environment in which it is easier for chicken mites to form colonies WC, and this makes it possible to maintain a state conducive to accumulating chicken mites over a long time period in the accumulating part 10.

The chicken mites accumulated in the accumulating part 10 are exterminated in the end.

Figure 5A:
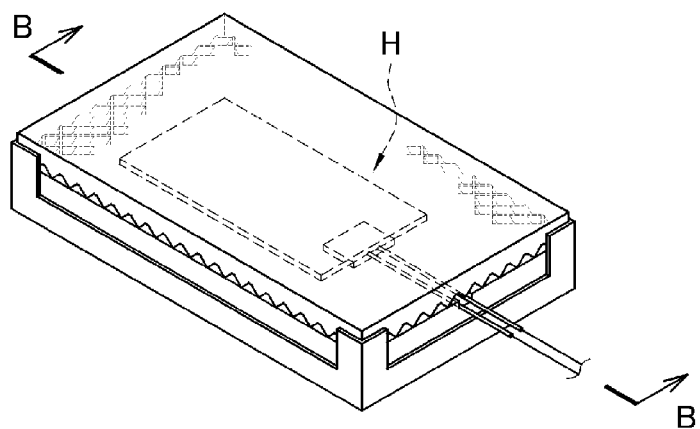
FIGS. 5A-5C are schematic explanatory diagrams illustrating a state in which a heater H is provided in the pest-accumulating device 1 of the present embodiment.
Figure 5B:
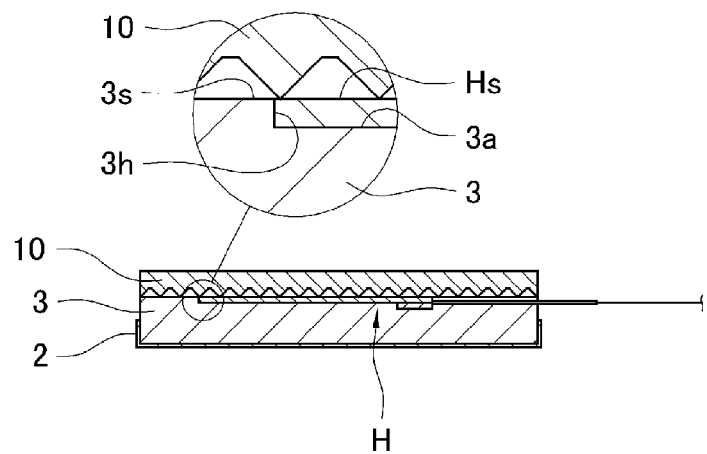
Figure 5C:
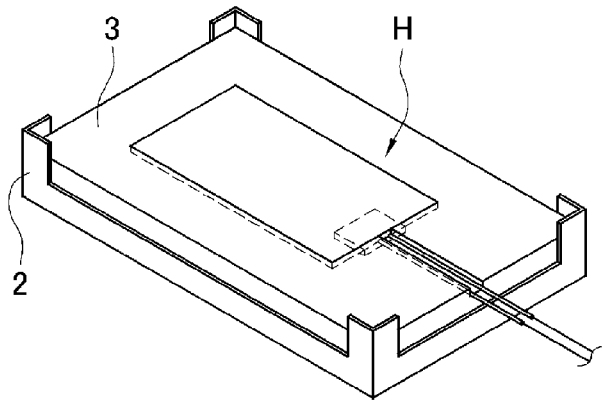

However, the method for exterminating the chicken mites accumulated in the accumulating part 10 is not particularly limited. For example, as will be described later, it is possible to incorporate within the accumulating part 10 the function of supplying heat (for example, raising the temperature to 65 degrees Celsius or higher) to the accumulating part 10 to the extent that the chicken mites are killed while gathered in the same. For example, as illustrated in FIGS. 5A-5C, a heater H may be provided between the accumulating part 10 and the charge leakage prevention part 3. After the colony WC of the chicken mites is formed in the accumulating part 10, the chicken mites can be efficiently exterminated if the temperature of the accumulating part 10 is raised to about 65 degrees Celsius or higher with the heater H.

(Charging by Corona Discharge)

Further, the method of charging by charge separation is described in the above example as a method for charging the surface 10s of the accumulating part 10. However, the method of charging by corona discharge may also be adopted. Specifically, when ions generated by corona discharge are guided to the surface 10s of the accumulating part 10, a charged layer in which a charge imbalance occurs can be formed on the surface 10s of the accumulating part 10. In this case, when the amount of ions generated by corona discharge is adjusted, the charged state of the charged layer can be adjusted, and thus a charged layer having the desired electrical charge can be easily formed. In addition, the charged layer can be efficiently formed in a short time period. Details will be described later.

(Detailed Description of Pest-Accumulating Device 1)

The pest-accumulating method is described in the above example. Below, the pest-accumulating device 1 for realizing such a pest-accumulating method is described in detail.

As illustrated in FIGS. 1A and 1B, the pest-accumulating device 1 includes an accumulating part 10, and a charge leakage prevention part 3 that holds the accumulating part 10.

(Accumulating Part 10)

As illustrated in FIGS. 1A and 1B, the accumulating part 10 is a material the surface 10s of which can be charged with a static electrical charge E, and is a component on the surface of which a charged layer can be formed. The material of the accumulating part 10 is not particularly limited as long as the charged layer of the surface of the accumulating part 10 can be charged with a static electrical charge. For example, acrylic resin, polyethylene, polypropylene, polyurethane, polytetrafluoroethylene (PTFE) of fluorine resin, polyvinyl chloride, glass, metal such as iron, and the like, can be used. When acrylic resin is adopted as the material of the accumulating part 10, a sufficient strength can be maintained even when the thickness of the accumulating part 10 is about 3 mm. Therefore, acrylic resin is preferable.

Further, the shape and dimensions of the accumulating part 10 are not particularly limited. For example, when the accumulating part 10 is placed on a pathway or above the cage KG in the poultry house CH, it is possible to adopt a substantially plate-like member with a substantially rectangular shape in the plan view having long sides of about 300 mm and short sides of about 200 mm, as illustrated in FIGS. 1A and 1B. When the accumulating part 10 is formed to such dimensions, it does not obstruct the workers during egg collection and the like, even when it is placed on the pathway, above the cage KG, or the like, in the poultry house CH, and handling, such as installation and the like, is easy, and thus it is preferable that the accumulating part 10 be formed to such dimensions.

Further, it is preferable that the accumulating part 10 have a thickness of 3 mm-5 mm. When the accumulating part 10 is formed with such a thickness, the electric field generated by the static electrical charge E formed on the surface 10s can reach the bottom surface 10b of the accumulating part 10. When the electric field reaches the bottom surface 10b of the accumulating part 10, chicken mites can be made to enter into the interspaces 10h that are formed between the bottom surface 10b of the accumulating part 10 and the upper surface 3s of the charge leakage prevention part 3, causing the chicken mites to form colonies WC inside the interspaces 10h. That is, the chicken mites gathered in the accumulating part 10 can be made to remain in the accumulating part 10 for a longer time period so that a large colony WC can be efficiently formed in the accumulating part 10.

(Charge Leakage Prevention Part 3)

As illustrated in FIGS. 1A and 1B, the charge leakage prevention part 3 is made with a shape and dimensions that are substantially similar to those of the accumulating part 10. Further, the charge leakage prevention part 3 is a member that is formed with a material that prevents the static electrical charge E with which the charged layer of the accumulating part 10 is charged from escaping to the ground and the like when the charge leakage prevention part 3 is placed on the ground or the like in a state in which the accumulating part 10 rests on the upper surface 3s of the charge leakage prevention part 3.

Specifically, it is preferable that the charge leakage prevention part 3 be formed with a material (a so-called non-conductor) that has a surface resistivity of $10^{10} \Omega$ or more and a volume resistivity of $10^8$ $\Omega \cdot m$ or more. This is because, when any one of the surface resistivity and the volume resistivity of the charge leakage prevention part 3 is less than the above values, the charge (surface charge) of the charged layer of the accumulating part 10 on the upper surface 3s of the charge leakage prevention part 3 is likely to leak via the charge leakage prevention part 3. The above conditions can be satisfied when foamed synthetic resin containing air bubbles (for example, foamed polystyrene), polyethylene, polypropylene, polyvinyl chloride, phenol resin, or the like, is adopted as the material of the charge leakage prevention part 3.

According to the above-described configuration, as illustrated in FIGS. 1A and 1B, when a charged layer charged with the static electrical charge E is formed on the surface 10s of the accumulating part 10, chicken mites can be gathered in the accumulating part 10. In addition, as illustrated in FIGS. 1A and 1B, the chicken mites gathered in the accumulating part 10 can be made to form colonies WC. That is, the chicken mites gathered in the accumulating part 10 can be made to remain in the accumulating part 10.

Further, when the accumulating part 10 is held by the charge leakage prevention part 3 that is formed with the material satisfying the above-described conditions, the charge imbalance (that is, the charged static electrical charge E) generated in the charged layer of the surface 10s of the accumulating part 10 can be maintained over a long time period. That is, the charged state of the accumulating part 10 can be maintained during the time period when chicken mites are active (for example, from evening to next morning), and thus larger colonies can be formed in the accumulating part 10.

Further, as described above, the static electrical charge E with which the surface 10s of the accumulating part 10 is charged is generated by charge separation through contact between or separation of different members (objects). It is possible to positively or negatively charge the surface (a so-called interface) of each of two different objects that are brought into contact with each other or separated from each other, such as in frictional charging due to friction between different objects, separation charging due to the separation of objects in close contact, collision charging due to the collision between different objects, and the like.

In particular, for the static electrical charge E that can be generated by charge separation, there is an advantage that the amount and polarity of the generated charge can be adjusted to some extent depending on the types of the two objects (members) that are brought into contact with or separated from each other.

For example, when acrylic resin is adopted as the material of the accumulating part 10 and nylon fiber is adopted as the other member, and the two are brought into contact with each other in a manner where they rub against each other, the surface 10s of the accumulating part 10 can be negatively (−) charged. That is, by appropriately selecting the material of the accumulating part 10 and the material of the other member, either a negatively or a positively charged layer can be arbitrarily formed as needed on the accumulating part 10. Further, by adjusting the contact resistance or the contact time period of the two members, the charged layer of the accumulating part 10 can be charged with a static electrical charge E of about 5 kv to 10 kv.

That is, when the accumulating part 10 is charged by charge separation as described above, it is not necessary to apply a high voltage from outside in order to form the charged layer of the accumulating part 10, and thus the pest-accumulating device 1 can be safely and easily handled.

(Description of Charge Generation Unit 20)

Further, it is preferable that the pest-accumulating device 1 of the present embodiment be provided with a charge generation unit 20 that has a function of forming the charged layer of the accumulating part 10 by charge separation as described above.

Figure 4A:
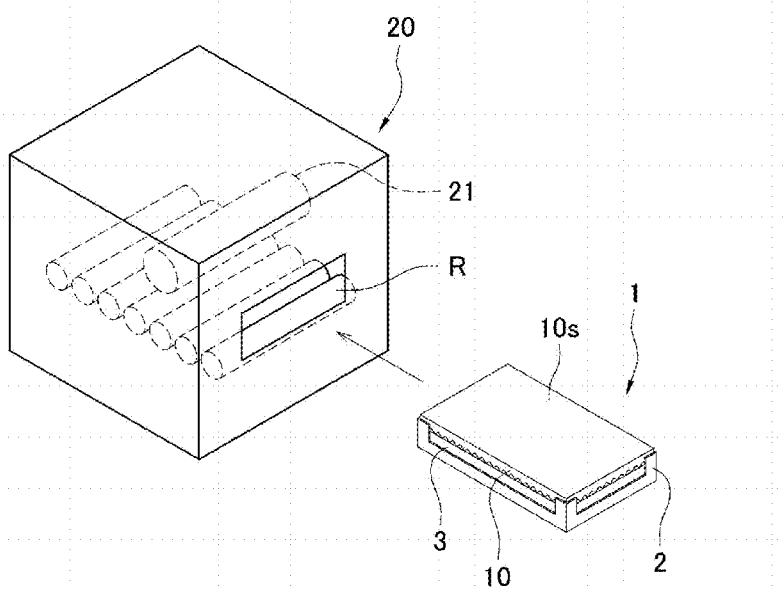
FIGS. 4A-4C are schematic explanatory diagrams illustrating a charge generation unit 20 for generating a static electrical charge E on the accumulating part 10 of the pest-accumulating device 1 of the present embodiment.
Figure 4B:
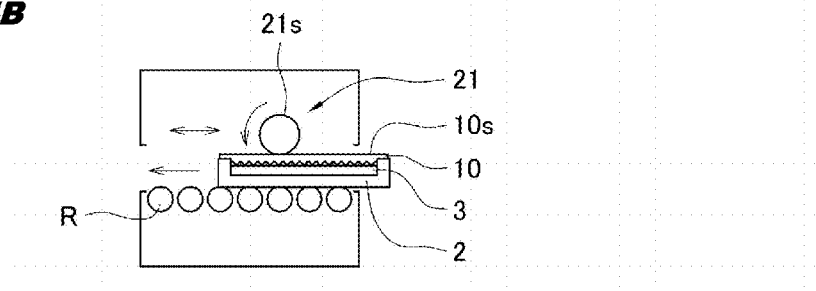
Figure 4C:
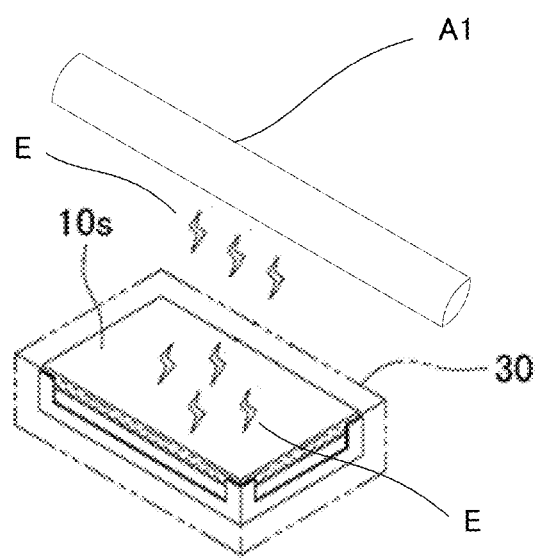

For example, as illustrated in FIGS. 4A-4C, the charge generation unit 20 is a substantially rectangular member, and is provided with a charging formation part that penetrates through front and back surfaces. The charging formation part is made to a size capable of accommodating the pest-accumulating device 1 or the accumulating part 10. A roller 21 is provided on the upper side inside the charging formation part. The roller 21 is installed to be rotatable and is further installed in such a manner that, when the pest-accumulating device 1 or the accumulating part 10 is accommodated in the charging formation part, the surface 10s of the accumulating part 10 and the surface 21s of the roller 21 are in contact with each other.

According to the above-described configuration, by just inserting the pest-accumulating device 1 or the accumulating part 10 into the charging formation part of the charge generation unit 20, a charged layer can be easily formed on the surface 10s of the accumulating part 10 by charge separation due to frictional charging. As illustrated in FIG. 4C, through frictional charging, a layer charged with the static electrical charge E can be formed on the surface 10s of the accumulating part 10 ejected from an opening on the back surface of the charging formation part of the charge generation unit 20. That is, a charged layer can be even more easily formed on the accumulating part 10 by just inserting the said part into the charging formation part of the charge generation unit 20. Moreover, such a charged layer is charged with the static electrical charge E that is formed by frictional charging that involves only rubbing the surface 21s of the roller 21 and the surface 10s of the accumulating part 10 against each other. Therefore, the charged layer can be even more easily and safely formed.

Further, it is preferable that the roller 21 have a structure that allows the roller 21 to move relatively with respect to the accumulating part 10. For example, as illustrated in FIG. 4B, when the roller 21 itself is made to slide in the axial direction (left-right direction in FIG. 4B) of the charging formation part, a charged layer can be even more efficiently formed on the surface 10s of the accumulating part 10.

Further, when the roller 21 is made to swing up and down, even when the size or thickness of the pest-accumulating device 1 or the accumulating part 10 varies, it is possible to ensure continued contact between the surface 21s of the roller 21 and the surface 10s of the accumulating part 10.

Furthermore, as illustrated in FIGS. 4A-4C, when a roller R is provided on the lower side inside the charging formation part, the pest-accumulating device 1 or the accumulating part 10 can be easily inserted or removed from the charging formation part.

As illustrated in FIG. 4C, when the accumulating part 10 that is charged with the static electrical charge E is accommodated in an insulating member 30 formed with a material that conducts hardly any electricity, the accumulating part 10 can be even more safely and easily handled.

In the above example, the case is described where a charged layer is formed on the surface 10s of the accumulating part 10 by charge separation due to frictional charging by the roller 21 provided in the charging formation part of the charge generation unit 20. However, the means for forming a charged layer on the surface 10s of the accumulating part 10 is not limited to the means described above. For example, the charging formation part of the charge generation unit 20 may also adopt a configuration in which a corona discharger capable of generating corona discharge is provided.

For example, a corona discharging part is provided on the upper side inside the charging formation part of the charge generation unit 20. The corona discharger has an ion generating part that generates ions due to corona discharge, and an ion emitting part that discharges generated ions outside. In FIG. 4C, corona discharger A1, which faces the surface 10s and emits corona charging toward surface 10s, is shown. In the state in which the accumulating part 10 is accommodated inside the charging formation part, the corona discharger is arranged inside the charging formation part in a manner that the ion emitting part opposes the surface 10s of the accumulating part 10. That is, the corona discharger is arranged inside the charging formation part in a manner that the ions emitted from the ion emitting part are supplied (irradiated) to the surface 10s of the accumulating part 10. Then, when the pest-accumulating device 1 or the accumulating part 10 is inserted into the charging formation part of the charge generation unit 20 and the corona discharger is actuated, a charged layer charged with the static electrical charge E can be formed on the surface 10s of the accumulating part 10. In addition, when the corona discharger is used, as compared to the case where a charged layer is formed by the above-described frictional charging, a charged layer can be formed in a shorter time.

Further, when the corona discharger is used to form a charged layer, as compared to the case where a charged layer is formed by the above-described frictional charging, a charged layer having a large electrical charge can be formed on the surface 10s of the accumulating part 10. Therefore, the effect of accumulating part 10, that is gathering chicken mites, can be maintained for a longer time period.

Further, handling of the corona discharger can be more safely performed because the corona discharger is accommodated inside the charging formation part of the charge generation unit 20; that is, it is isolated from the outside.

Further, it is preferable that the accumulating part 10 have a structure in which, in the state in which the accumulating part 10 is arranged in such a manner that the bottom surface 10b of the accumulating part 10 is in contact with the upper surface 3s of the charge leakage prevention part 3, interspaces 10h are formed between the bottom surface 10b and the upper surface 3s of the charge leakage prevention part 3. In this case, the interspaces 10h become hiding places for the chicken mites gathered in the accumulating part 10. This thereby creates an environment in which it is easier for chicken mites to form colonies WC and in which accumulated chicken mites can be made to remain in the accumulating part 10 over a long time period.

The size and shape of the interspaces 10h is not particularly limited as long as the interspaces 10h are places where chicken mites can enter and form colonies WC therein. Further, the method for forming the interspaces 10h is also not particularly limited.

For example, as illustrated in FIGS. 1A and 1B, a structure can be adopted in which a plurality of convex parts, each having a shape of a substantially quadrangular pyramid in a plan view, are provided on the bottom surface 10b of the accumulating part 10. On the bottom surface 10b of the accumulating part 10, on which the plurality of convex parts are formed, each of the convex parts can be formed to have a substantially triangular cross section. That is, a valley part (concave part) can be formed between adjacent convex parts. When the bottom surface 10b of the accumulating part 10 and the upper surface 3s of the charge leakage prevention part 3 are arranged opposing each other, apex parts of the plurality of the convex parts are in contact with the upper surface 3s of the charge leakage prevention part 3. However, the concave parts can be arranged so as not to be in contact with the upper surface 3s of the charge leakage prevention part 3. Thus, spaces, that is, the interspaces 10h, can be formed between the uneven surface and the upper surface 3s of the charge leakage prevention part 3. In the state in which chicken mites are gathered in the accumulating part 10, the interspaces 10h formed by the uneven surface become hiding places for the chicken mites gathered in the accumulating part 10. This creates an environment in which it is easier for chicken mites to form colonies WC, and in which accumulated chicken mites can be made to remain in the accumulating part 10 over a long time period.

As illustrated in FIGS. 5A-5C, a configuration may be adopted in which a heater H may be provided between the accumulating part 10 and the charge leakage prevention part 3. As described above, it is preferable that the heater H have a function of supplying sufficient heat (for example, raising a temperature to 65 degrees Celsius or higher) to the accumulating part 10 so that the chicken mites are killed. It is more preferable that the heater H have a function capable of momentarily changing the temperature depending on time.

For example, when the pest-accumulating device 1 provided with the heater H is placed in the poultry house CH, at the initial installation, the temperature of the surface 10s of the accumulating part 10 is set to about 30-40 degrees Celsius, which is close to the body temperature of a chicken. By setting the temperature in this way, it is possible to accumulate more chicken mites in the accumulating part 10. Then, at the stage where chicken mites have completed forming the colony WC in the accumulating part 10, the temperature of the surface 10s of the accumulating part 10 is momentarily raised to 65 degrees Celsius or higher. In this case, as a temperature of 65 degrees Celsius or higher is equal to or higher than the temperature at which chicken mites die, when the temperature of the surface 10s of the accumulating part 10 is raised to this temperature, the chicken mites accumulated in the accumulating part 10 can be surely exterminated.

Configurations of the heater H and the charge leakage prevention part 3 are not particularly limited. However, for example, the following configurations can be adopted.

The heater H includes a heater part for converting electrical energy to thermal energy and supplying heat to the accumulating part 10 and a temperature controller for adjusting the heat of the heater part. In the heater part, a temperature sensor is provided that senses the heat of the heater part and transmits the sensed temperature to the temperature controller.

Further, in the charge leakage prevention part 3, a heater part accommodation space 3h is provided on the upper surface 3s, the space 3h being a recess shape 3s downward so that the heater part is fit in. The heater part accommodation space 3h is formed to have a shape substantially similar to that of the heater part and to have a size slightly larger than that of the heater part.

Then, as illustrated in FIGS. 5B and 5C, when the heater part of the heater H is accommodated in the heater part accommodation space 3h, the surface Hs of the heater part and the upper surface 3s of the charge leakage prevention part 3 can be arranged to be substantially flush with each other. In this case, the heater part does not become a hindrance when the chicken mites gathered in the accumulating part 10 enter into the interspaces 10h that are formed between the accumulating part 10 and the charge leakage prevention part 3. Therefore, the chicken mites can more readily enter the interspaces 10h.

(Description of Diffusion Liquid)

As described above, by just placing the pest-accumulating device of the present invention with the accumulating part that is charged with a static electrical charge in a poultry house inhabited by chicken mites, chicken mites near the accumulating part can be gathered in the accumulating part (see FIGS. 1A, 1B, 2A and 2B).

That is, when the pest-accumulating device of the present invention is placed in a region inhabited by chicken mites, the number of the chicken mites inhabiting the region can be reliably reduced. Therefore, the size of a colony that exists near the accumulating part can be reduced.

However, it is difficult to exterminate a colony of chicken mites that has formed in a crevice in the poultry house, such as in the hinge of a metal part of a cage. As long as a situation in which the colony itself, which is the habitat of chicken mites, can survive (for example, a situation in which breeding chicken mites inhabit the colony) is maintained, it is expected that a certain number of chicken mites will continue to inhabit the colony, that is, will continue to inhabit the poultry house.

When the chicken mites inhabiting such a colony in a crevice in the poultry house can be expelled from the colony, the expelled chicken mites can be accumulated by the accumulating part of the pest-accumulating device of the present invention, thereby further improving the chicken mite extermination efficiency.

For example, when a diffusion liquid having a repellent effect with respect to chicken mites is applied to the colony (that is, to the chicken mites that inhabit the colony) by spraying or dispersing the diffusion liquid, the chicken mites inhabiting the colony can be made to disperse. It is preferable that the diffusion liquid be safe and not cause the chickens any stress (for example, a decrease in egg production) when sprayed or otherwise applied to the colony.

An example of a diffusion liquid that has a repellent effect with respect to chicken mites and does not cause stress to chickens is pyroligneous acid. Pyroligneous acid contains ingredients derived from natural products and has a repellent effect with respect to pests and is thus preferable. For example, it is possible to use pyroligneous acid prepared at a concentration that does not cause stress to chickens yet still has a repellent effect.

When the pyroligneous acid prepared as described above (hereinafter, simply referred to "prepared pyroligneous acid") is sprayed into a place where a colony is likely to exist near the accumulating part of the pest-accumulating device of the present invention, the chicken mites can be dispersed from the colony due to the repellent effect of the prepared pyroligneous acid with respect to chicken mites. In addition, by spraying the prepared pyroligneous acid, (fine) particle-like prepared pyroligneous acid can penetrate the colony, making it possible to maintain the repellent effect over a long time period. Therefore, the chicken mites can be prevented from re-accumulating in the colony to which the prepared pyroligneous acid has been applied by spraying or the like. In other words, the chicken mites that have been made to disperse are placed in a situation in which they are forced to form a new colony in another place.

Chicken mites that are forced into such a situation will, due to the characteristic described above, form a colony when a certain period of time has elapsed. Therefore, when the accumulating part of the pest-accumulating device of the present embodiment is placed near the place where the prepared pyroligneous acid is sprayed, the chicken mites expelled from the colony can be gathered in the accumulating part of the pest-accumulating device.

Therefore, when the accumulating part of the pest-accumulating device of the present embodiment is combined with the use of prepared pyroligneous acid, the said part can accumulate not only wandering chicken mites, but even those chicken mites that inhabit a colony and are breeding. Thus, the chicken mite accumulation efficiency can be even further improved. Moreover, the pyroligneous acid is a natural substance, and thus can be safely used near chickens and safely handled by humans. Further, since only a simple operation is involved, such as applying the pyroligneous acid to a colony by spraying, the chicken mite accumulation efficiency can be improved while controlling work efficiency from being suppressed. Further, if pyroligneous acid obtained as a by-product during the production of charcoal or the like is used, the said substance can be obtained at a lower cost than typical agricultural chemicals. Therefore, this method is also economical.

In the above-described example, a case is described where the natural pyroligneous acid obtained from trees and the like is utilized as the diffusion liquid. However, as long as it is a liquid that has a repellent effect with respect to chicken mites, the diffusion liquid is not limited to natural pyroligneous acid; a synthesized pyroligneous acid or bamboo vinegar or the like may also be used. For example, when a synthetic pyroligneous acid is used, an artificial pyroligneous acid may be used, which is artificially prepared to have the same component ratios as those of an organic acid or a volatile compound contained in the pyroligneous acid having the same repellent effect with respect to chicken mites as described above.

Figure 11:
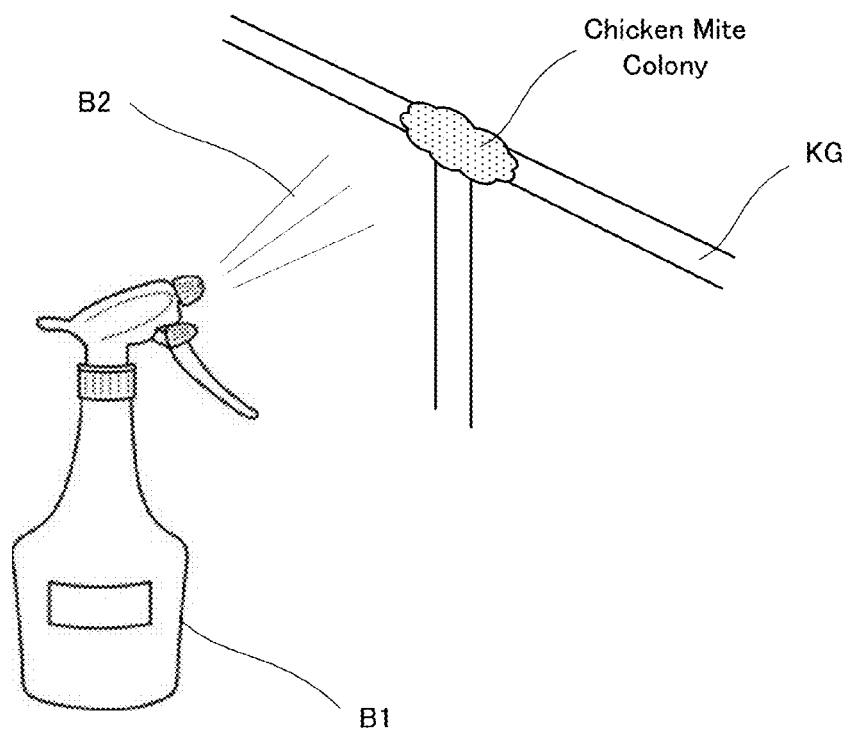
FIG. 11 illustrates a sprayer as an embodiment of a diffusion unit.
Figure 12:
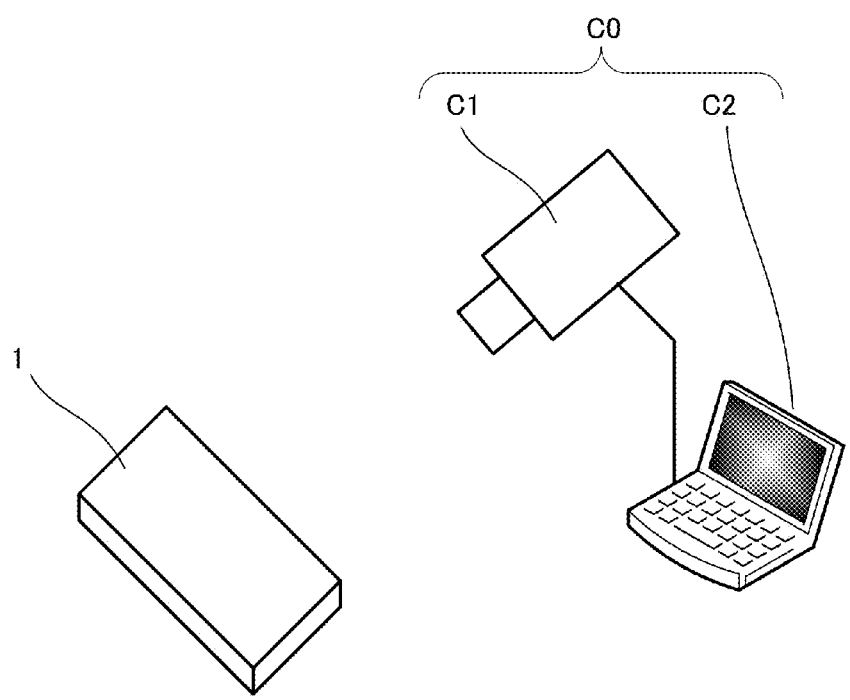
FIG. 12 illustrates a CCD camera and a notebook computer as an embodiment of an analysis unit.

The method for applying the diffusion liquid to the colony is not particularly limited. For example, a mister, a sprayer, or the like can be used. Such a mister or the like corresponds to a diffusion unit of the claims. FIG. 11 illustrates sprayer B1 that spays diffusion liquid B2 toward a chicken mite colony nested on cage KG. Further, the diffusion unit is not limited to the above devices and the like, and is not particularly limited as long as it is a means that can apply the diffusion liquid to a colony by spraying or the like.

(Description of Pest-Inspecting Device)

When the above-described pest-accumulating device 1 is used, it is also possible to evaluate the state of chicken mite inhabitation in a poultry house and the like. In the following, a pest-inspecting device using the above-described pest-accumulating device 1 is described.

The pest-inspecting device includes an accumulating unit that is provided with a chicken mite accumulating part to be placed in an inspection region, and an analysis unit that evaluates the state of chicken mite inhabitation in the inspection region based on the situation of a colony WC that is formed by chicken mites accumulated in the accumulating part.

The accumulating unit of the pest-inspecting device uses the above-described pest-accumulating device 1 of the present embodiment, and the accumulating part of the accumulating unit uses the accumulating part 10 of the pest-accumulating device 1. Therefore, as described above, the chicken mites in the inspection region can be reliably accumulated, and thus the state of chicken mite inhabitation in the inspection region can be appropriately evaluated.

The accumulating unit is not particularly limited as long as it can accumulate chicken mites. However, when the above-described pest-accumulating device 1 of the present embodiment is used, chicken mites can be efficiently accumulated, and thus the pest-accumulating device 1 is preferable.

The analysis unit of the pest-inspecting device includes an image capture part that takes images of the accumulating part 10; a colony detector that, based on the image taken by the image capture part, detects a colony WC of chicken mites accumulated in the accumulating part 10 and calculates the area of the same; and a chicken mite detector that measures the number of chicken mites that exist in the colony WC detected by the colony detector.

The image capture unit is not particularly limited as long as it is an image capture part that can capture images of the colony WC of the chicken mites accumulated in the accumulating part 10. For example, a CCD camera or the like can be used. However, an image capture part capable of capturing a digital image is preferable.

The colony detector can receive measured image data that is measured by the image capture unit, identify a colony WC from the measured image data, and calculate the area of the identified colony WC. The colony detector is not particularly limited as long as it is a detector that can identify other portions of the accumulating part 10, objects other than the colony WC and the colony WC, and calculate the area of the identified colony WC.

For example, as the colony detector, a program or the like can be used that has a function of detecting the colony WC based on variation in brightness or color in an image and calculating the area of the detected region based on the number of image dots. Further, as the colony detector, a program or the like can also be used that has a function of approximating the colony WC by a circle and estimating the area of the circle as the area of the colony WC.

The chicken mite detector can measure the number of chicken mites in the chicken mite colony WC that is detected by the colony detector. The chicken mite detector is not particularly limited as long as it is a detector capable of calculating the number of chicken mites in the colony WC.

For example, when the measured image data is a digital image, the chicken mite detector can be a program or the like that has a function capable of identifying individual chicken mites in the colony WC according to variations in brightness or color in the colony WC and the area of a region of a specific brightness or color.

The chicken mite detector can be one that identifies individual chicken mites for the entire colony WC and calculates the number of the chicken mites, or one that calculates the number of chicken mites that exist in a region of a specific area in the colony WC, and, based on the number of chicken mites and the area of the colony WC, estimates the number of the chicken mites that exist in the colony WC.

The analysis unit includes an analysis part that has a function of estimating the state of chicken mite inhabitation in the inspection region (a region of a predetermined range from the accumulating part 10) based on the area of, and the number of chicken mites in, the colony WC that have been calculated by the chicken mite detector and the colony detector as described above.

Specifically, the analysis part has a function of estimating the number of chicken mites inhabiting the inspection region based on the number of chicken mites in the colony WC and the area of the colony WC. Such estimation is possible for the reason described below.

It can be assumed that the chicken mites accumulated in the accumulating part 10 are chicken mites that inhabit the inspection region and have moved to and accumulated in the accumulating part 10. It is conceivable that, of the chicken mites inhabiting the inspection region, the number of chicken mites accumulated in the accumulating part 10 within a predetermined time period corresponds to the total number of chicken mites inhabiting the inspection region. That is, when the number of all chicken mites inhabiting the inspection region is large, the number of chicken mites accumulated in the accumulating part 10 within a predetermined time period increases. When the number of all chicken mites inhabiting the inspection region is small, the number of chicken mites accumulated in the accumulating part 10 within a predetermined time period decreases. Therefore, if the number of chicken mites accumulated in the accumulating part 10 within a predetermined time period can be determined, the number of chicken mites inhabiting the inspection region can be estimated.

The analysis part may also have a function of estimating the amount of blood sucked in the inspection region and the like. When the amount of blood sucked can be estimated, the stress experienced by the raised chickens can be directly measured, which results in the added advantage of being able to numerically confirm the effect on production.

According to the above-described configuration, in the pest-inspecting device of the present embodiment, when the accumulating part 10 is arranged in the inspection region and chicken mites are accumulated in the accumulating part 10 to form the colony WC, the state of chicken mite inhabitation in the inspection region can be evaluated by using the analysis unit to analyze the state of the colony WC. That is, the state of chicken mite inhabitation in the poultry house CH can be grasped. In other words, the state of the breeding environment of the chickens CK and the like can be evaluated. Then, appropriate measures (such as the timing of mite extermination, or adjusting the feed method) can be taken in response to the state of chicken mite inhabitation.

In particular, it is preferable that the chicken mite detector have a function of identifying the body surface color of the chicken mites. In this case, it is possible that, of the chicken mites in the colony WC, chicken mites that have sucked blood (hereinafter, simply referred to as blood-sucking chicken mites) can be detected and distinguished from other chicken mites based on their surface color, so that only the number of blood-sucking chicken mites is measured. It is conceivable that the percentage of blood-sucking chicken mites existing in the colony WC of the accumulating part 10 corresponds to the percentage of blood-sucking chicken mites in the inspection region. It is also conceivable that the percentage of blood-sucking chicken mites in a certain region is in correspondence with the total number of chicken mites in the region. Then, even without grasping the number of all chicken mites in the colony WC, the state of chicken mite inhabitation in the inspection region can be easily determined by determining the number of blood-sucking chicken mites in the inspection region. In addition, blood-sucking chicken mites are easily identified and thus, improved estimation accuracy can be expected as compared to the case of grasping the total number of chicken mites.

Blood-sucking chicken mites can be identified as follows.

The body surfaces of blood-sucking chicken mites exhibit the color of sucked blood (such as a color close to reddish brown). For example, when evaluated with an RGB color model, the body surface colors of blood-sucking chicken mites are in the ranges of R82-99, G47-67 and B69-82. Therefore, with respect to digital image data measured by the image capture unit, it is possible to estimate the number of blood-sucking chicken mites when the number and area of the regions of the above colors are detected. In addition, since only the number and region of predetermined colors are measured, the number of chicken mites can be measured more easily and quickly.

In the above example, the case is described where the pest-accumulating device 1 of the present embodiment is used to gather, capture and inspect chicken mites. However, the pest-accumulating device 1 of the present embodiment can potentially be applied for similar purposes with respect to arthropods and the like, such as mites and flies other than chicken mites but having similar properties to chicken mites.

Example 1

It was confirmed that the number of chicken mites existing in a colony can be measured by image processing.

In an experiment, an image of a chicken mite colony that was formed at a predetermined measuring point in a poultry house was captured. The number of blood-sucking chicken mites existing in the colony that was measured by visually confirming the captured image was compared with the number of blood-sucking chicken mites existing in the colony that was detected by image processing.

A poultry house with no windows (a so-called windowless poultry house) was used. The windowless poultry house was one in which a work pathway was provided and in which three-tiers metal chicken cages were arranged on both sides of the pathway.

Chickens raised in the windowless poultry house were for egg production, and there were about 90 chickens in total.

A CCD camera (manufactured by Panasonic Corporation, Model Number: DMC-FT20) was used to capture images of the chicken mite colony. The image capturing conditions were as follows: a lens was fixed at a distance of 5 cm from the joint and wire of a cage in which chicken mites had accumulated and at an angle of 20 degrees above the horizontal angle, and flash photographs were taken. Further, the images were taken in such a manner that the size of the chicken mites was about 1000-5600 pixels of the CCD camera. That is, the images were taken in such a manner that a 1 mm square was equivalent to 3819 pixels.

A digital image analysis unit having a function of receiving and analyzing the image data captured by the CCD camera C1 was used to detect the number of blood-sucking chicken mites by image processing.

A notebook PC (C2 manufactured by Acer Inc., Model Number: Aspire 5750) was used as the digital image analysis part. The notebook PC had a hard disk (HDD), and the HDD was used for data storage and the like. These CCD camera C1 and notebook PC C2 are components of analysis unit C0.

Further, the number of blood-sucking chicken mites was calculated using an image analysis processing program software (WinRoof V6.5, developed by Mitani Co., Ltd.) that was installed in the PC.

The color of the body surface of chicken mites that have sucked blood changes. Therefore, the number of image dots having that color was used as the number of blood-sucking chicken mites (blood-sucking marks). In the present experiment, in the RGB color model, colors in the ranges of R82-99, G47-67 and B69-82 were determined as the colors of blood-sucking chicken mites.

As a result, it was confirmed that the number of blood-sucking chicken mites existing in the colony that was measured visually, and the number of blood-sucking chicken mites existing in the colony that was detected by image processing were substantially the same. That is, it was confirmed that when colors in the ranges of R82-99, G47-67 and B69-82 in the RGB color model are determined as blood-sucking chicken mites and image capturing is performed under the above-described conditions, the number of blood-sucking chicken mites (that is, the number of blood-sucking marks) can be detected even by image processing.

Example 2

The effectiveness of the pest-accumulating method and the pest-accumulating device of the present invention was confirmed.

In an experiment, it was confirmed that chicken mites accumulated in the accumulating part when the said part was placed in the poultry house where chicken mites existed after a charged layer had been formed in the said part by frictional charging. Further, an experiment to measure the number of chicken mites near the accumulating part in the poultry house was performed, and the effectiveness of the device and the method of the present invention was confirmed.

Devices and conditions used in the experiment were as follows.

Acrylic resin was adopted as the material of the accumulating part. Dimensions of the accumulating part were as follows: an acrylic panel of a thickness of 5 mm formed in a plate-like shape having short sides of a length (width) of 175 mm and long sides of a length (length) of 250 mm. The adopted acrylic panel had an uneven lower surface.

Foamed polystyrene resin was adopted as the material of the charge leakage prevention part. Dimensions of the charge leakage prevention part were as follows: styrene foam (hereinafter, simply referred to as styrene foam) of a thickness of 20 mm formed in a plate-like shape having short sides of a length (width) of 175 mm and long sides of a length (length) of 250 mm. A device (hereinafter, referred to as an experimental device) was used in which the acrylic panel used as the accumulating part was overlaid on top of the styrene foam used as the charge leakage prevention part.

The charged layer, which was charged with a static electrical charge, of the accumulating part was formed in the following manner.

A cloth with fibers of polyamide resin was used as the member for generating friction on the surface of the accumulating part. By keeping the cloth in continuous contact with the surface of the accumulating part, the charged layer was formed on the surface of the accumulating part by frictional charging.

The charged layer had an initial voltage of about 3.0-5.0 kV and voltages of about 2.0-3.0 kV after 2 hours and after 8 hours.

An electrostatic potential measuring device (manufactured by Shishido Electrostatic Ltd., Model Number: STAT-IRON-M2) was used to measure the voltage of the charged layer at a position about 2 cm above the surface of the acrylic panel.

A windowless poultry house was used. The windowless poultry house was one with a work pathway and three-tiers metal chicken cages arranged on both sides of the pathway.

The experimental device was arranged at the end of the pathway in the windowless poultry house so as to not hinder the workers.

Further, chickens raised in the windowless poultry house were for egg production, and there were about 90 chickens in total.

Increases and decreases in the number of chicken mites in the poultry house were grasped by measuring the number of chicken mites inhabiting a chicken mite colony at a predetermined measuring point.

The number of chicken mites was measured as follows. The number of blood-sucking mark dots in the digital images of the chicken mite colony (hereinafter, referred to as the digital image analysis chicken mite blood-sucking reaction dot number) was measured, and the number of chicken mites existing in the colony was estimated based on the number of blood-sucking mark dots.

For the measurement of the digital image analysis chicken mite blood-sucking reaction dot number, a CCD camera (manufactured by Panasonic Corporation, Model Number: DMC-FT20) was used to capture images of the accumulating part, and a digital image analysis unit was used to receive and analyze the image data captured by the CCD camera.

A notebook PC (manufactured by Acer Inc., Model Number: Aspire 5750) was used for the digital image analysis unit. The notebook PC had a hard disk (HDD), and the HDD was used as data storage and the like. Further, an image analysis processing program software (WinRoof V6.5, developed by Mitani Co., Ltd.) was installed in the PC, and this software was used to analyze the blood-sucking reaction of chicken mites as dots based on the image data captured by the CCD camera. The software function for calculating the number of chicken mites based on the number of the analyzed dots was used to estimate the number of chicken mites.

The blood-sucking marks of the chicken mites were obtained by the above-described method of measuring the color of the chicken mite body surface, which changes with blood-sucking. The number of blood-sucking marks corresponds to the number of chicken mites that have sucked blood. In other words, the number of chicken mites can be estimated based on the number of blood-sucking marks. For example, if 10 individual chicken mites inhabit a colony, by converting the dots, each of which is equivalent to 1 chicken mite, the number of chicken mites can be calculated. Then, it can be estimated that the number of chicken mites inhabiting the colony is 10.

The measurement experiment was performed in the following manner.

First, images of a predetermined measuring point in the poultry house were captured at the same predetermined times of day using the CCD camera by installing the CCD camera near a chicken mite colony and performing image capturing under the same conditions, such as the same angle and the same distance. Based on the image data captured using the CCD camera, the number of chicken mites inhabiting the colony at the measuring point was calculated.

A hinge on the upper part of the second-tier cage among three-tier cages was used as the measuring point near the experimental device, the hinge part being about 2 m above and about 0.5 m away from the experimental device in a horizontal direction.

Further, as a comparative experiment, the state of a chicken mite colony in a cage a sufficient distance away from the experimental device was also observed. A hinge on the upper side of the second-stage cage among the three-stage cages was used as the measuring point of the comparative experiment, the hinge part being about 2 m above and about 2.5 m away from the experimental device in the horizontal direction.

The experimental results are illustrated in FIGS. 6A-8B.

Figure 6A:
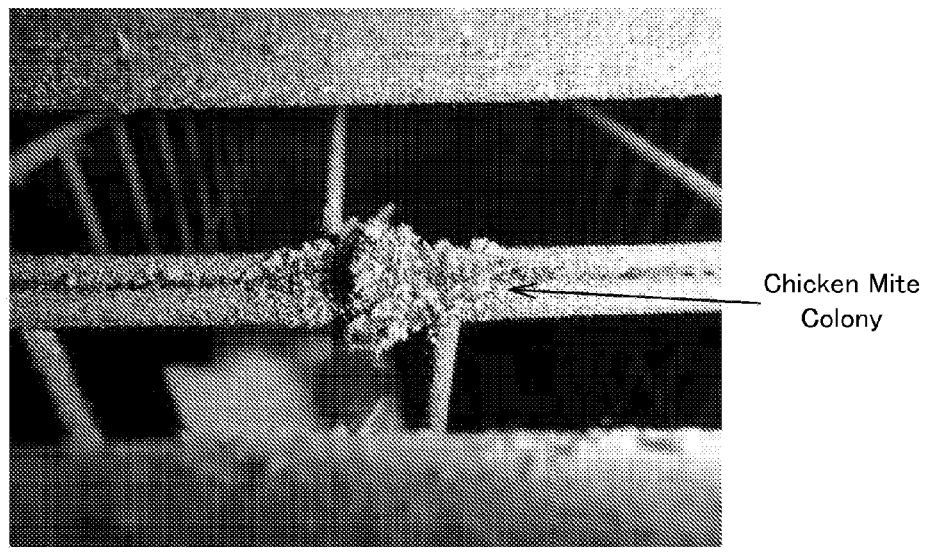
FIGS. 6A and 6B show the state of a measuring point in a cage near a working example of an experimental device.
Figure 6A:
Figure 6B:
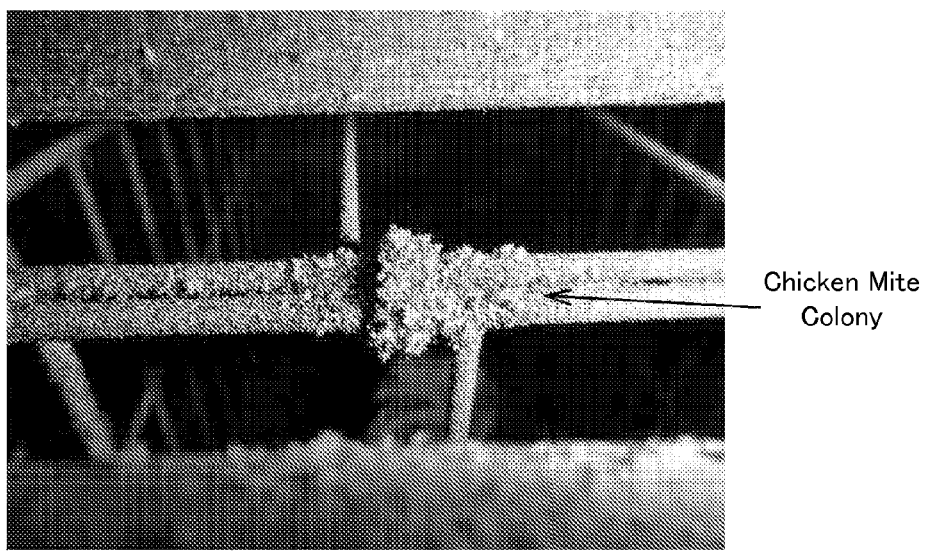

FIGS. 6A and 6B illustrate the state of the measuring point in the cage near the experimental device. FIG. 6A illustrates the state immediately before the experimental device was installed and FIG. 6B illustrates the state 3 days after the experimental device was installed.

As illustrated in FIGS. 6A and 6B, regarding the size of the chicken mite colony at the measuring point of the cage, it was confirmed that, as compared to the colony of FIG. 6A, the size of the colony of FIG. 6B was clearly smaller.

Further, the number of chicken mites inhabiting the colonies of FIGS. 6A and 6B was calculated based on digital image analysis chicken mite blood-sucking reaction dot numbers. The results were 1682 (temperature: 27.7 degrees Celsius; humidity: 63%) for FIG. 6A; and 701 (temperature 28.1 degrees Celsius; humidity: 69%) for FIG. 6B. When these results were subjected to corrective calculation and were converted to numbers of chicken mites, it was confirmed that the number of chicken mites inhabiting the colony at the measuring point in the cage was 489 before the experimental device was installed and that the number was drastically reduced to 141 after the experimental device was installed. Therefore, it was confirmed that the number of chicken mites also decreased in proportion to the size of the colony.

Figure 7A:
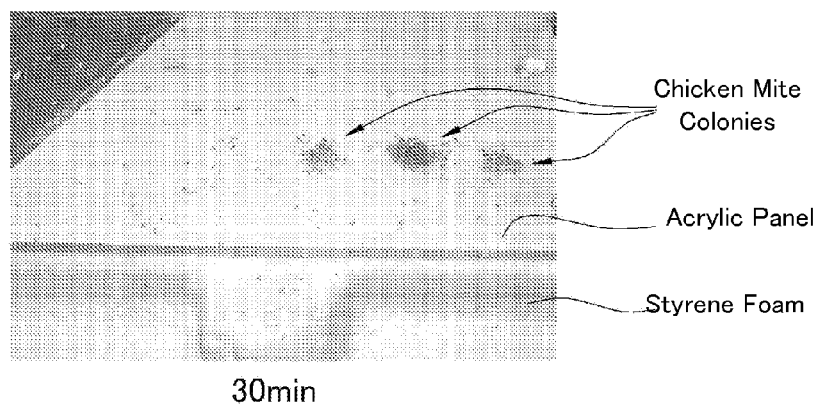
FIGS. 7A-7C show the state of a chicken mite colony in the accumulating part of the experimental device of the working example.
Figure 7B:
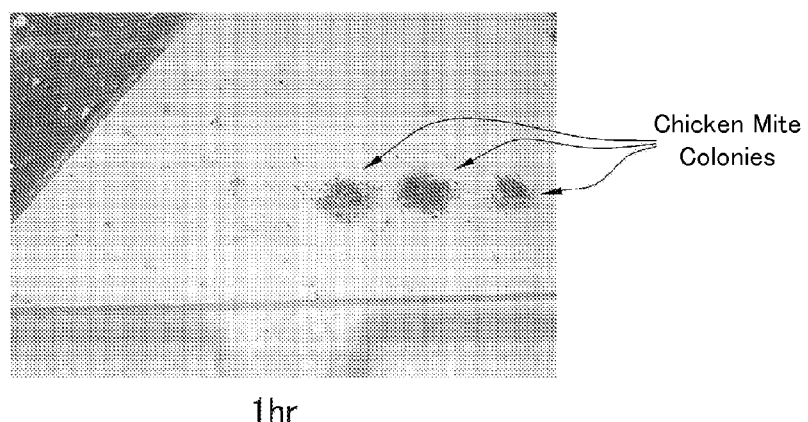
Figure 7C:
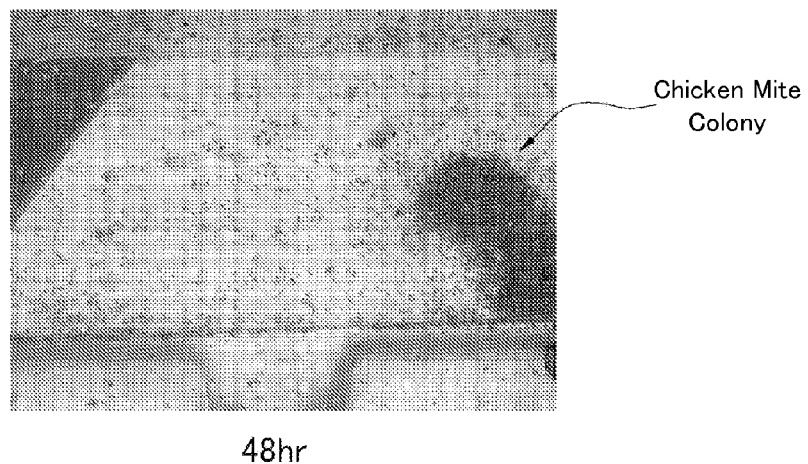

FIGS. 7A-7C illustrate the state of chicken mite colonies in the accumulating part of the experimental device: FIG. 7A illustrates the state 30 minutes after installation of the experimental device; FIG. 7B illustrates the state 1 hour after installation; and FIG. 7C illustrates the state 48 hours after installation.

As illustrated in FIGS. 7A-7C, it was confirmed that chicken mites gathered in the accumulating part of the experimental device (see FIG. 7A). In addition, it was confirmed that the number of the chicken mites that were gathered in the accumulating part increased in proportion to the time elapsed, and that a colony was formed in a fashion that the individuals were accumulated (see FIG. 7B). Further, it was confirmed that the colony formed by the accumulating part increased in size in the order of FIG. 7A, FIG. 7B and FIG. 7C in proportion to the time elapsed.

Figure 8A:
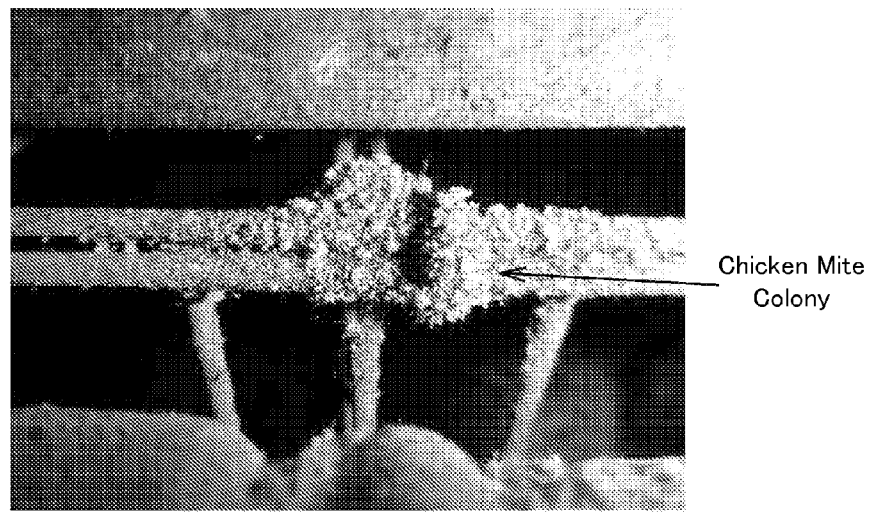
FIGS. 8A and 8B show the state of a measuring point in the cage of a comparative experiment of the working example.
Figure 8A:
Figure 8B:
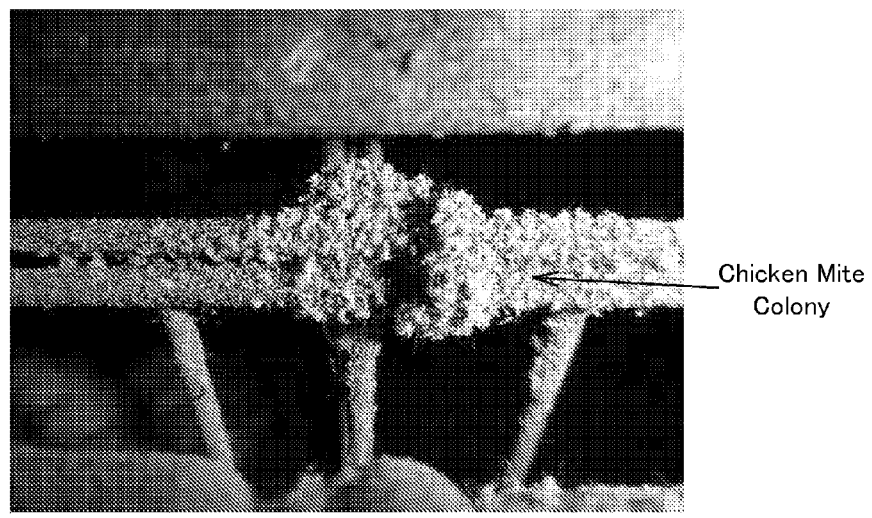

FIGS. 8A and 8B illustrate the state of the measuring point in the cage of the comparative experiment: FIG. 8A illustrates the state immediately before the experimental device was installed; and FIG. 8B illustrates the state 3 days after the experimental device was installed.

As illustrated in FIGS. 8A and 8B, regarding the size of the chicken mite colony, it was confirmed that, as compared to the colony of FIG. 8A, the size of the colony of FIG. 8B was clearly larger.

Further, the number of chicken mites inhabiting the colonies of FIGS. 8A and 8B was calculated based on digital image analysis chicken mite blood-sucking reaction dot numbers. The results were 511 (temperature: 27.7 degrees Celsius; humidity: 63%) for FIG. 8A; and 1168 (temperature 28.1 degrees Celsius; humidity: 69%) for FIG. 8B. When these results were subjected to corrective calculation and were converted to numbers of chicken mites, it was confirmed that the number of chicken mites inhabiting the colony at the measuring point in the cage of the comparative experiment was 203 before the experimental device was installed, and that the number drastically increased to 402 after the experimental device was installed. Therefore, it was confirmed that the number of chicken mites also increased in proportion to the size of the colony. In other words, it was confirmed that the results of the comparative experiment were completely opposite to the state of the colony at the measuring point near the experimental device.

From the above results, it was confirmed that chicken mites have a habit of gathering in a place charged with a static electrical charge. In other words, it was confirmed that chicken mites can be attracted by using a static electrical charge.

That is, it was confirmed that, (1) when a charged layer is formed by frictional charging in the accumulating part of the pest-accumulating device of the present invention arranged in a windowless poultry house, chicken mites can be accumulated. On the other hand, it was confirmed that, (2) for a colony formed between narrow hinges in a cage within the range of a radius of about 1-1.5 m from the accumulating part of the pest-accumulating device of the present invention, the size of the colony decreases substantially in proportion to the time period during which the accumulating part of the pest-accumulating device of the present invention is installed, and the number of chicken mites inhabiting the colony also decreases. Therefore, from (1) and (2), it was presumed that chicken mites inhabiting spaces near the accumulating part of the pest-accumulating device of the present invention can be gathered in the accumulating part. In other words, it was confirmed that, according to the present invention, chicken mites inhabiting narrow spaces such as the hinges of a cage can be attracted to and made to stay in a place where they can be easily exterminated by a worker.

Example 3

The effectiveness of the pest-inspecting device of the present invention was confirmed.

In an experiment, it was confirmed that, by placing an accumulating part with a charged layer in a poultry house, thereby causing chicken mites to accumulate and form a colony in the accumulating part, and by measuring the number of chicken mites existing in the colony, the state of chicken mite inhabitation in an inspection region in the poultry house can be determined.

The devices and conditions used in the present experiment were the same as those used in Example 2, including the accumulating part, the charge leakage prevention part, the method of charging the surface of the accumulating part with the static electrical charge, the device and the operation method of the device for measuring the number of chicken mites in chicken mite colonies formed in the poultry house where the present pest-inspecting device was placed, and in the accumulating part.

The results are illustrated below.

(1) Concerning the State of Chicken Mites Accumulated in the Accumulating Part

The state of chicken mites accumulated in the accumulating part was measured 2 days after the accumulating part was placed in the poultry house.

The number of chicken mites in the chicken mite colony in the accumulating part was calculated based on the digital image analysis chicken mite blood-sucking reaction dot number. As a result, the number of the chicken mites in the chicken mite colony in the accumulating part was estimated to be about 4530 (temperature: 27.8 degrees Celsius; humidity: 57%).

(2) Concerning the State of Chicken Mites in the Inspection Region

To determine the state of chicken mites inhabiting the chicken mite colony at the above-described predetermined measuring point, the number of chicken mites inhabiting the colony was calculated as described above based on the digital image analysis chicken mite blood-sucking reaction dot number before and after the accumulating part was placed in the poultry house.

First, before the accumulating part was placed in the poultry house, the number of chicken mites inhabiting the colony at the above-described predetermined measuring point was 489 (temperature: 27.7 degrees Celsius; humidity: 63%). After the accumulating part was placed in the poultry house, the number of chicken mites inhabiting the colony at the above-described predetermined measuring point was 141 (temperature: 28.1 degrees Celsius; humidity: 69%). That is, it was confirmed that the number of chicken mites inhabiting the colony at the measuring point in the cage was 489 before the accumulating part was installed, and the number drastically decreased to 141 after the accumulating part was installed. In other words, the number of chicken mites was reduced by 71% after placement of the accumulating part compared to before placement of the same.

From the above results, the number of chicken mites accumulated in the accumulating part was estimated to be 4530. On the other hand, the number of chicken mites inhabiting the chicken mite colony that was formed in a predetermined region (the inspection region) from the accumulating part was reduced by about 348 (71%) after installment of the accumulating part (from 489 before installment to 141 after installment). As illustrated in Example 1, it was confirmed that, in a chicken mite colony at a measuring point beyond the range of a radius of about 1-1.5 m from the accumulating part, the number of the chicken mites inhabiting the colony increased with the amount of time elapsed. Then, it was estimated that, of the chicken mites accumulated in the accumulating part (about 4530), about 348 had moved to the accumulating part from the colony at the measuring point in the inspection region (the colony formed by about 489 chicken mites). Therefore, based on the number of chicken mites accumulated in the accumulating part, the number of chicken mites inhabiting the inspection region was estimated to be about 6380. That is, it was estimated that about 6000 chicken mites existed per $m^3$ in the poultry house.

Therefore, it was inferred that the state of chicken mite inhabitation in the inspection region can be evaluated using the pest-inspecting device of the present invention. That is, it was inferred that the present invention can be used to grasp the state of chicken mite inhabitation in the poultry house, and thus, that the breeding environment of chickens and the like in the poultry house can also be evaluated.

Example 4

The effect of the electrostatic environment in the present invention's pest-accumulating method and the accumulating part of the pest-accumulating device on the accumulation efficiency was confirmed.

In an experiment, the effect on the accumulation efficiency of chicken mites due to the electrostatic environment formed in the accumulating part was made clear by respectively placing a device with a charged layer in the accumulating part and a device in which a charged layer was prevented from being formed in the accumulating part in a poultry house where chicken mites existed.

The devices and conditions used in the present experiment were the same as those used in Example 2, including the accumulating part, the charge leakage prevention part, and the method of charging the surface of the accumulating part with the static electrical charge. The device having an accumulating part with a charged layer is hereinafter simply referred to as a charged device.

Further, a device having an accumulating part without a charged layer (hereinafter simply referred to as a non-charged device) was used as a control area. In the present experiment, a static elimination agent (IORIZER, manufactured by Kasuga Electric Works Co., Ltd.; Model Number: #3000) and a static eliminator (IONIZER, manufactured by Biomedical, Inc.; Model Number: BMS-SJ-1900) were used to prevent a charged layer from being formed in the accumulating part.

When the static elimination agent was used, the accumulating part was placed in a predetermined place after spraying the static elimination agent on the accumulating part and confirming that a film had formed on the said part's surface.

Further, when the static eliminator was used, the accumulating part was placed in a predetermined place after it was confirmed that the said part had been neutralized by ions radiated from the static eliminator (IONIZER, manufactured by Biomedical, Inc.; Model Number: BMS-SJ-1900).

Six sites were selected in the poultry house in each of which the charged device and the non-charged device were placed adjacent to each other. The placement period was 10 minutes. When 10 minutes elapsed after placement, the total number of chicken mites accumulated in the accumulating parts of the respective devices was measured. This was performed 3 times for each of the sites. The measurement method consisted of collecting all the chicken mites attracted to the accumulating device on an A3 sheet of paper, and counting by sight all chicken mites that could be confirmed. Then, the total numbers and average values of the chicken mites in the two devices were compared.

The following procedure was used to identify chicken mites.

First, the captured pests were deeply anesthetized with chloroform for a period of 30 minutes or longer. Next, the deeply anesthetized pests were immersed in absolute alcohol for 24 hours. After 24-hour immersion, the pests were processed using an ionic liquid of 1%-5%. Thereafter, the pests were fixed on a sample stage using carbon tape and were each examined with a scanning electron microscope (SEM) (manufactured by Hitachi Ltd.; Model Number: TM3030).

Figure 9:
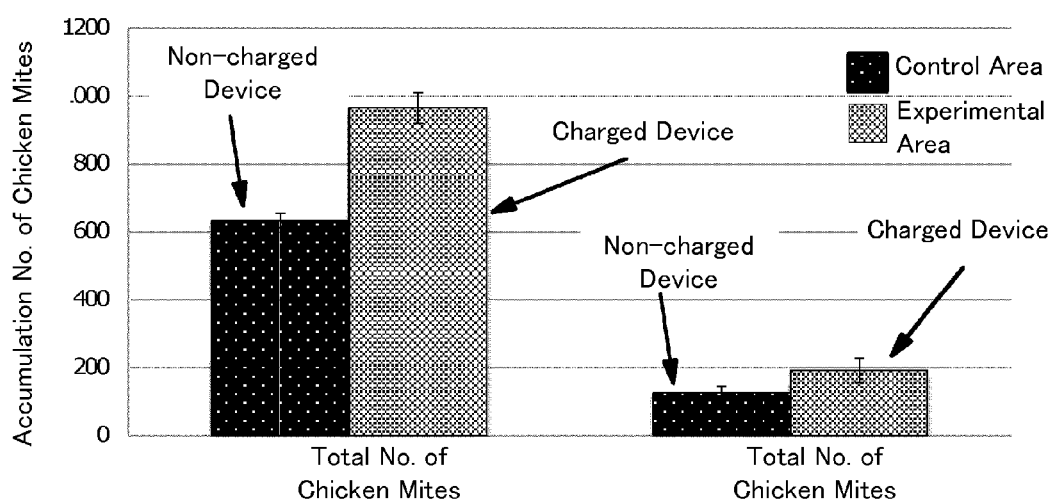
FIG. 9 illustrates the effect on accumulation efficiency of the presence or absence of an electrostatic environment in the experimental device of the working example.

The experimental results are illustrated in FIG. 9.

As illustrated in FIG. 9, it was confirmed that, even when the total number of chicken mites inhabiting each of the placement sites differed, by using the charged devices, it was possible to collect about 200 chicken mites on average with each charged device, in spite of the short time period of 10 minutes.

As illustrated in FIG. 9, significant differences were confirmed between the total number and average value of the chicken mites accumulated in the charged devices and the total number and average value of the chicken mites accumulated in the non-charged devices. That is, it is clear that the number of chicken mites accumulated in the charged device increased as compared to the control area. While variation occurs in the number of chicken mites that can be accumulated at each placement site due to the fact that chicken mite colonies in the poultry house are not evenly distributed, it became clear that chicken mites that accumulate due to the formation of a charged layer in an accumulating part do exist.

From the above results, it was confirmed that significant numbers of chicken mites can be accumulated by forming a charged layer in the accumulating part of the pest-accumulating device of the present invention, as compared to the case where no charged layer is formed in the accumulating part. That is, it was confirmed that chicken mites can be efficiently accumulated by providing an electrostatic environment in the accumulating part of the pest-accumulating device.

Example 5

The effectiveness of using pyroligneous acid as the diffusion liquid in the pest-accumulating method and the pest-accumulating device of the present invention was confirmed.

The devices and conditions used in the present experiment were the same as those used in Example 2, including the accumulating part, the charge leakage prevention part, and the method of charging the surface of the accumulating part with the static electrical charge.

Undiluted pyroligneous acid manufactured by Miyazaki Midori Pharms Inc. was used as the diffusion liquid. The method for applying the pyroligneous acid to a chicken mite colony consisted of using a sprayer to spray the pyroligneous acid, at about 2 ml/m$^2$, into a chicken mite colony formed in the joint of a cage in the poultry house.

The pyroligneous acid used in the experiment was a pyroligneous acid derived from broadleaf tree bark. Gas chromatography was used to analyze the components of the said acid, and the results showed the main components to be, for example, lower alcohols and carboxylic acids, such as methanol at 1.78 g/l, acetic acid at 29.29 g/l and propionic acid at 1.17 g/l. Further, the pyroligneous acid contained, for example, phenol at 0.24 g/l, guaiacol at 0.19 g/l, methyl guaiacol at 0.11 g/l, syringol at 0.18 g/l and cyclotene at 0.10 g/l at concentrations of 0.01 w/v % or more (for details see Bulletin of Faculty of Engineering, University of Miyazaki, No. 27, pp 51-61).

Further, the components and the like contained in the pyroligneous acid that was used in the experiment were identified using a device (SEM-EDX) (manufactured by Hitachi High-Technologies Corporation; Model Number: Desktop Microscope: TM3030 and Energy Dispersive X-ray Spectrometer: SwiftED 3000) that combines a scanning electron microscope and an energy dispersive X-ray spectrometer.

First, five sites were selected in the poultry house and an experimental device was placed in each. The placement time period was 5 minutes. When 5 minutes had elapsed after placement, the number of chicken mites accumulated in the accumulating parts of the respective experimental devices was measured. This procedure was performed 9 times for each site. The accumulation values of chicken mites accumulated at the respective sites were used as control areas.

Next, the pyroligneous acid was sprayed into colonies near the 5 selected sites. The colonies into which the pyroligneous acid was sprayed were those that could be discovered by sight. About 3 hours after the pyroligneous acid was sprayed, experimental devices were placed at the same sites as for the control areas. The placement time period was 5 minutes. When 5 minutes had elapsed after placement, chicken mites accumulated in the accumulating parts of the respective experimental devices were measured. This procedure was performed 9 times for each site. The accumulation values of chicken mites accumulated at the same sites as the respective control areas were used as experimental areas.

The calculation method was the same as that used in Example 4, and all chicken mites were measured by sight.

Figure 10:
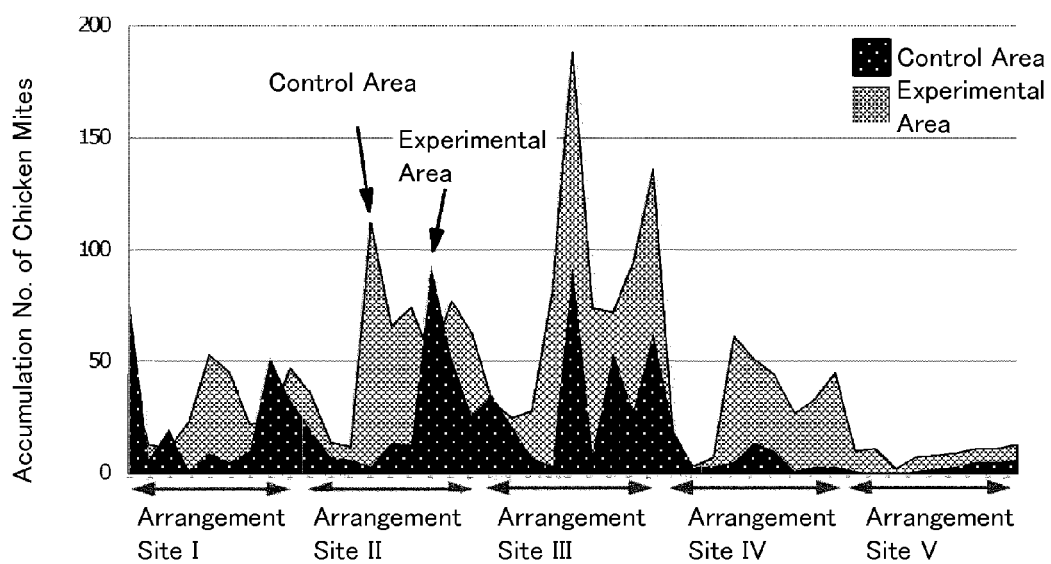
FIG. 10 illustrates the repellent effect of pyroligneous acid.

The experimental results are illustrated in FIG. 10.

FIG. 10 illustrates the relation between the number of chicken mites accumulated in the accumulating device and the repellent effect of the pyroligneous acid.

As illustrated in FIG. 10, it was confirmed that the experimental areas clearly accumulated more chicken mites than the control areas in terms of the number (or accumulation number) of chicken mites collected by each of the experimental area experimental devices and the number collected by each of the control area experimental devices.

From the above results, it was confirmed that the accumulation number of chicken mites could be reliably increased with the use of pyroligneous acid as the diffusion liquid as compared to cases where pyroligneous acid was not used. Therefore, it was confirmed that the synergistic effect between the pyroligneous acid that was used as the diffusion liquid and the pest-accumulating device of the present invention could improve the chicken mite accumulation efficiency of the accumulating part of the pest-accumulating device of the present invention. That is, it was inferred that it was possible to improve chicken mite accumulation efficiency due to the synergistic effect between the chicken mite accumulating effect of the accumulating part of the pest-accumulating device of the present invention and the repellent effect of the pyroligneous acid against chicken mites.

INDUSTRIAL APPLICABILITY

The pest-accumulating device, the pest-accumulating method and the pest-inspecting device of the present invention are suitable for extermination of pests such as chicken mites and arthropods such as mites, fleas and flies with similar properties to chicken mites.

LEGENDS

1: pest-accumulating device
3: charge leakage prevention part
10: accumulating part 10s: surface of accumulating part
10h: interspaces between accumulating part and charge leakage prevention part
CH: poultry house
KG: cage
WC: chicken mite colony

What is claimed is:

1. A pest-accumulating device for accumulating mites, comprising:
an accumulating part made of a material that allows a charged layer to be formed on a surface thereof, wherein
the accumulating part includes a charge leakage prevention part that holds a charge, which is generated in the charged layer of the accumulating part, so that the charge does not escape.

2. The pest-accumulating device according to claim 1, wherein
the charged layer is formed by corona discharge.

3. The pest-accumulating device according to claim 2, wherein
the accumulating part has an uneven surface.

4. The pest-accumulating device according to claim 1, comprising
a charge generation unit that forms the charged layer of the accumulating part, wherein
the charge generation unit has a function of forming the charged layer of the accumulating part by corona discharge.

5. The pest-accumulating device according to claim 1, wherein
the charged layer is formed by charge separation.

6. The pest-accumulating device according to claim 5, wherein
the accumulating part has an uneven surface.

7. The pest-accumulating device according to claim 1, comprising
a charge generation unit that forms the charged layer of the accumulating part, wherein
the charge generation part has a function of forming the charged layer of the accumulating part by charge separation.

8. The pest-accumulating device according to claim 7, wherein
the charge generation unit
generates frictional charging between the charge generation part and the accumulating part and
forms the charged layer of the accumulating part by the frictional charging.

9. The pest-accumulating device according to claim 1, comprising
a diffusion unit that has a function of causing the mites to disperse from a colony that is formed by the mites in a region which the mites inhabit.

10. The pest-accumulating device according to claim 9, wherein
the diffusion unit applies a diffusion liquid made of pyroligneous acid to the region which the mites inhabit.

11. A pest-inspecting device for inspecting the state of mite inhabitation, comprising:
an accumulating unit for accumulating the mites, that is provided with an accumulating part that is placed in an inspection region for inspecting the state of mite inhabitation; and
an analysis unit that evaluates the state of mite inhabitation in the inspection region based on the state of a colony formed by the mites, the colony being accumulated in the accumulating part of the accumulating unit, wherein
the accumulating unit is the accumulating part of the pest-accumulating device according to claim 1.

12. The pest-inspecting device according to claim 11, wherein
the analysis unit
obtains an area of the colony and a number of specific mites existing in the colony, and
evaluates the state of mite inhabitation in the inspection region based on the number of the specific mites and the area of the colony.

13. The pest-inspecting device according to claim 12, wherein
the specific mites are blood-sucking mites that have sucked blood.

14. The pest-inspecting device according to claim 13, wherein
the analysis unit distinguishes the blood-sucking mites from other mites based on colors of body surfaces of the blood-sucking mites.

15. The pest-inspecting device according to claim 14, wherein,
when the colors of the body surfaces of the mites are within ranges of R82-99, G47-67 or B69-82 in an RGB color model, the mites are determined to be blood-sucking mites.

16. A pest-accumulating method for accumulating mites, comprising:
forming a charged layer in an accumulating part that allows a charged layer to be formed on a surface thereof; and
installing the accumulating part in which the charged layer is formed in a region which the mites inhabit.

17. The pest-accumulating method according to claim 16, wherein
the charged layer is formed by corona discharge.

18. The pest-accumulating method according to claim 17, wherein
the accumulating part has an uneven surface.

19. The pest-accumulating method according to claim 17, wherein
the accumulating part is arranged in a state in which the accumulating part is held in a charge leakage prevention part so that a charge generated in the charged layer of the accumulating part cannot escape.

20. The pest-accumulating method according to claim 16, wherein
the accumulating part is arranged in a state in which the accumulating part is held in a charge leakage prevention part so that a charge generated in the charged layer of the accumulating part cannot escape.

21. The pest-accumulating method according to claim 16, wherein
the charged layer is formed by charge separation.

22. The pest-accumulating method according to claim 21, wherein
the accumulating part has an uneven surface.

23. The pest-accumulating method according to claim 16, wherein
the charged layer of the accumulating part is formed by frictional charging.

24. The pest-accumulating method according to claim 16, comprising
causing the mites to disperse from a colony that is formed by the mites in a region which the mites inhabit.

25. The pest-accumulating method according to claim 1, comprising
applying a diffusion liquid made of pyroligneous acid to the colony formed by the mites in the region which the mites inhabit.

* * * * *